(12) United States Patent  
Nishiyama et al.

(10) Patent No.: US 8,671,039 B2  
(45) Date of Patent: Mar. 11, 2014

(54) INFORMATION PROCESSING SYSTEM, INFORMATION PROCESSING METHOD AND COMPUTER READABLE MEDIUM

(75) Inventors: Kenji Nishiyama, Kawasaki (JP); Osamu Nakamura, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1206 days.

(21) Appl. No.: 11/867,045

(22) Filed: Oct. 4, 2007

(65) Prior Publication Data

US 2008/0208604 A1 Aug. 28, 2008

(30) Foreign Application Priority Data

Oct. 4, 2006 (JP) ................................. 2006-273488

(51) Int. Cl.  
*G06Q 40/00* (2012.01)

(52) U.S. Cl.  
USPC ............... 705/35; 705/30; 705/31; 705/32; 705/36 R; 705/36 T

(58) Field of Classification Search  
USPC ....... 705/35, 31, 32, 30, 7, 36 R, 36 T; 703/6; 717/120  
See application file for complete search history.

(56) References Cited

U.S. PATENT DOCUMENTS

| | | | |
|---|---|---|---|
| 5,887,154 A | 3/1999 | Iwasa et al. | |
| 5,999,724 A | 12/1999 | Iwasa et al. | |
| 6,311,166 B1* | 10/2001 | Nado et al. | 705/30 |
| 7,200,535 B2* | 4/2007 | Abraham-Fuchs et al. | 703/6 |
| 2002/0152156 A1 | 10/2002 | Tyson-Quah | |
| 2002/0156644 A1 | 10/2002 | Davies et al. | |
| 2002/0194059 A1 | 12/2002 | Blocher et al. | |
| 2004/0084277 A1 | 5/2004 | Blair | |
| 2004/0093293 A1* | 5/2004 | Cheung | 705/36 |
| 2004/0107115 A1 | 6/2004 | Takano et al. | |
| 2004/0236651 A1 | 11/2004 | Emde et al. | |
| 2004/0260634 A1* | 12/2004 | King et al. | 705/35 |
| 2005/0055451 A1 | 3/2005 | Tsuyama et al. | |

(Continued)

FOREIGN PATENT DOCUMENTS

| | | |
|---|---|---|
| CN | 1518699 A | 8/2004 |
| JP | 5-165844 A | 7/1993 |

(Continued)

OTHER PUBLICATIONS

Chinese Office Action issued Jun. 28, 2010, in counterpart Chinese Application No. 200710181940.5.

(Continued)

*Primary Examiner* — Behrang Badii  
(74) *Attorney, Agent, or Firm* — Sughrue Mion, PLLC

(57) ABSTRACT

An information processing system includes a receiving unit, a risk control matrix storage unit and a dummy control setting unit. The receiving unit receives assumed risks and controls corresponding to the assumed risks. The risk control matrix storage unit stores a risk control matrix in which a correspondence relation between the risks and the controls is described. If evaluation of design effectiveness is performed to check a document regarding an operation to be controlled in an internal control of operations and if the dummy control setting unit determines that there is a risk having no control corresponding thereto in the risk control matrix stored in the risk control matrix storage unit, the dummy control setting unit sets a dummy control for the risk having no corresponding control in the risk control matrix and stores the risk control matrix.

9 Claims, 24 Drawing Sheets

(56) References Cited

U.S. PATENT DOCUMENTS

| | | |
|---|---|---|
| 2005/0137883 A1 | 6/2005 | Nohgawa et al. |
| 2005/0258246 A1 | 11/2005 | Wolff et al. |
| 2006/0004688 A1 | 1/2006 | Scanlon et al. |
| 2006/0039045 A1 | 2/2006 | Sato et al. |
| 2006/0052156 A1 | 3/2006 | Yates et al. |
| 2006/0059026 A1 | 3/2006 | King et al. |
| 2006/0074699 A1 | 4/2006 | Samsky et al. |
| 2006/0085442 A1 | 4/2006 | Fujiwara |
| 2006/0212373 A1* | 9/2006 | Maxwell et al. ............. 705/35 |
| 2006/0212486 A1 | 9/2006 | Kennis et al. |
| 2006/0268352 A1 | 11/2006 | Tanigawa et al. |
| 2006/0277080 A1* | 12/2006 | DeMartine et al. ............ 705/7 |
| 2007/0090179 A1 | 4/2007 | Konishi et al. |
| 2007/0108270 A1 | 5/2007 | Bjoraker et al. |
| 2007/0179870 A1 | 8/2007 | Goodbody et al. |
| 2009/0018885 A1 | 1/2009 | Parales |

FOREIGN PATENT DOCUMENTS

| | | |
|---|---|---|
| JP | 8-190587 A | 7/1996 |
| JP | 2003-196435 A | 7/2003 |
| JP | 2003-256633 A | 9/2003 |
| JP | 2006040069 | 2/2006 |
| JP | 2006-110978 A | 4/2006 |
| JP | 2006-330863 A | 12/2006 |
| JP | 2007-26207 A | 2/2007 |
| WO | 2005/119384 A1 | 12/2005 |

OTHER PUBLICATIONS

U.S. Appl. No. 11/863,332.
U.S. Appl. No. 11/959,516.
U.S. Appl. No. 12/016,237.
Ozaki, Norikazu. "Product Know/Select/Use," Nikkei Systems. No. 159, Japan, Nikkei BP, Inc., Nikkei Business Publications, Inc., Jun. 26, 2006. pp. 114-119.
Shimada, Yuko. "Reality of SOX Act Corresponding Software." Nikkei Computer. No. 650, Japan, Nikkei BP, Inc., Nikkei Business Publications, Inc., Apr. 17, 2006, No. 650, pp. 58-65.
Japanese Office Action issued in corresponding Japanese Application No. 2006-273488 on Sep. 13, 2011.

* cited by examiner

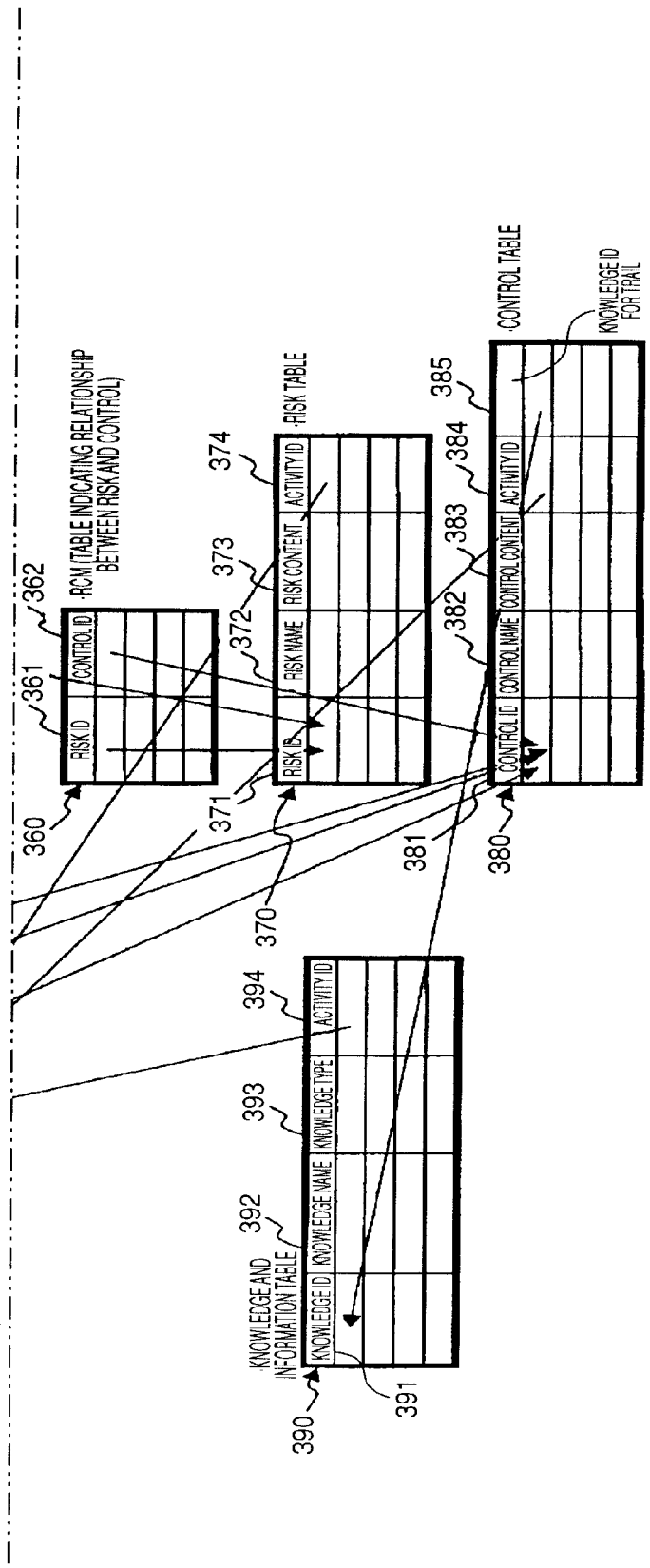

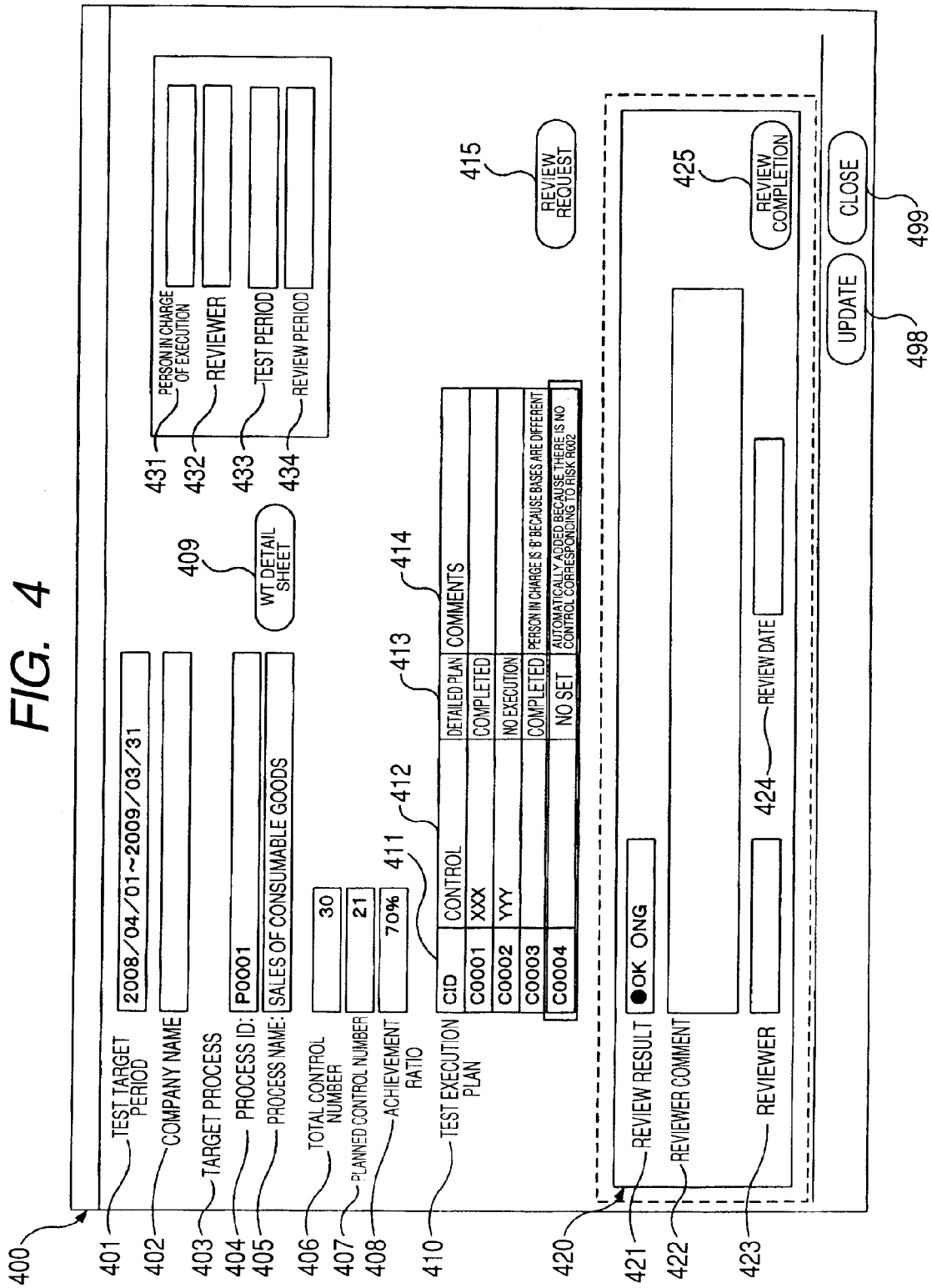

FIG. 8

SELECT CONTROL TO BE TESTED

CONTROL

|  | CID | CONTROL CONTENT |
|---|---|---|
| ☐ | C01 | XXX |
| ☐ | C02 | YYY |

☐ DESCRIPTION CHECK

OK  CANCEL

FIG. 10

900 / 910 CONTROL

| | | |
|---|---|---|
| 911 | CONTROL ID | C001 |
| 912 | CONTROL CONTENT | GROUP LEADER'S APPROVAL |
| 913 | KEY CONTROL | ○YES ○NO |
| 914 | TYPE OF CONTROL | ○ SYSTEM ○ MANUAL ○ PREVENTIVE ○ DISCOVERY |
| 915 | CONTROL FREQUENCY | WEEKLY |
| 916 | STATISTICAL BASIS | CLIENT INFORMATION MEMO |
| 917 | TRAIL OF CONTROL EXECUTION | |
| 918 | CONTROL ID | |
| 919 | PURPOSE OF INFORMATION PROCESSING CONTROL | ○C ○A ○V ○R |

920

| | TEST PROCEDURE | | TEST RESULT | | | |
|---|---|---|---|---|---|---|
| | TYPE (922) | EXECUTION CONTENT (921) | RESULT (925) | DIFFERENCE FROM RESULT (926) | DIFFERENCE CONTENT (924) | COMMENT (928) |
| 1 | BROWSE | TEST METHOD OF BROWSE | OK | NONE | | |
| 2 | RE-EXECUTION | TEST METHOD OF RE-EXECUTION | NG | DIFFERENT | AAAA | |

(923) (927)

( CLOSE )

1010 TEST DATA

| WT-ID (1011) | RESOURCE (DB) NAME (1012) | SERIAL-NO (SLIP NUMBER) (1013) | COMMENTS (1014) |
|---|---|---|---|
| ALL | SHIPPING INSTRUCTION DB | 2006-08-43222 | |
| | | | |

1020
- 1021 — WT-ID [  ]
- 1022 — RESOURCE (DB) NAME [  ]
- 1023 — SERIAL-NO (SLIP NUMBER) [  ]
- 1024 — REMARKS [  ]

1025 ( OK )   1026 ( CANCEL )

1098 ( UPDATE )   1099 ( CLOSE )

| DEFICIENCY LIST 1111 | 1112 | 1113 | 1114 | 1115 | 1116 | 1117 |
|---|---|---|---|---|---|---|
| PID | PROCESS NAME | CID | CONTROL CONTENT | ALTERNATIVE C | COUNTERMEASURE | IMPROVEMENT PLAN |
| P03 | SALES OF CONSUMABLE GOODS | C02 | CHECKING BY PERSON IN CHARGE | C04 (R03) | IMPROVEMENT IS REQUIRED | OPEN |
| P03 | SALES OF CONSUMABLE GOODS | C04 | CROSSCHECK BY PERSONS IN CHARGE | C02 (R03) C03 (R04) | IMPROVEMENT IS REQUIRED | OPEN |
| P05 | AAAA | C03 | BBBB | | IMPROVEMENT IS NOT REQUIRED | |

FIG. 13

REMAINING RISK LIST (1210)

| PID | PROCESS NAME | RID | RISK CONTENT | COMPLEMENT CONTROL | WHETHER OR NOT COUNTERMEASURE IS REQUIRED | IMPROVEMENT PLAN | FINANCIAL IMPORTANCE | OCCURRENCE PROBABILITY | COMPREHENSIVE ASSESSMENT |
|---|---|---|---|---|---|---|---|---|---|
| P03 | SALES OF CONSUMABLE GOODS | R03 | XXXXX | NONE | REQUIRED | CREATE | HIGH | MIDDLE | |
| P03 | SALES OF CONSUMABLE GOODS | R05 | ZZZZ | NONE | REQUIRED | OPEN | MIDDLE | MIDDLE | |
| P05 | AAAA | R02 | BBBB | YES | NOT REQUIRED | | LOW | LOW | |

1211 1212 1213 1214 1215 1216 1217 1218 1219 1220

1200

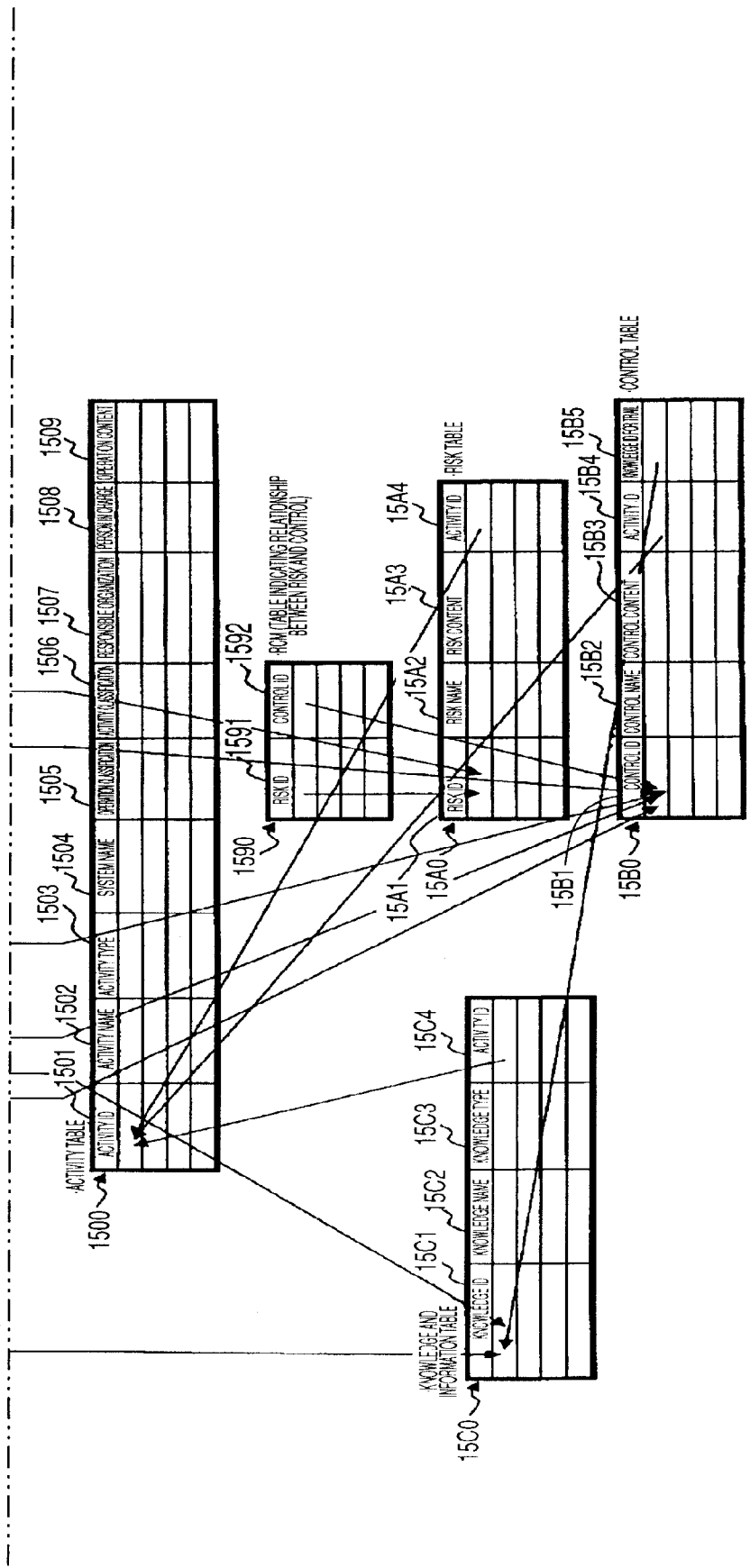

FIG. 18

| Label | Field | Value |
|---|---|---|
| 1701 | TEST TARGET PERIOD | 2008/04/01~2009/03/31 |
| 1702 | COMPANY NAME | |
| 1703 | PROCESS ID: | P03 |
| 1704 | PROCESS NAME: | SALES OF CONSUMABLE GOODS |
| 1705 | CONTROL | GROUP LEADER'S APPROVAL |
| 1706 | PROCEDURE TYPE: | ○ QUESTION ○ OBSERVATION ○ BROWSE ○ CHECK |
| 1707 | EXECUTION CONTENT | |
| 1708 | NUMBER OF SAMPLINGS | 50  (MODIFY) 1709 1710 MODIFICATION REASON |
| 1711 | ASSESSMENT CRITERIA | |
| 1712 | DEVIATION RATE | 10%▼  1713 RELIABILITY 90%▼  1714 ALLOWABLE NG NUMBER 2 |

1715 SAMPLING TARGET

| KNOWLEDGE AND INFORMATION (TRAIL) 1716 | SAMPLING ATTRIBUTE 1717 | TEST TARGET ATTRIBUTE 1718 |
|---|---|---|
| ORDER LETTER | ORDER NUMBER | PRICE |

(ADD) 1719  (EDIT) 1720  (DELETE) 1721

1722 CHECKING TARGET

| KNOWLEDGE AND INFORMATION (TRAIL) 1723 | SAMPLING ATTRIBUTE 1724 | TEST TARGET ATTRIBUTE 1725 |
|---|---|---|
| SHIPPING INSTRUCTION LETTER | ORDER NUMBER | PRICE |

(ADD) 1726  (EDIT) 1727  (DELETE) 1728

1730
- 1731 REVIEW RESULT ● OK ○ NG
- 1732 REVIEWER COMMENT
- 1733 REVIEWER
- 1734 REVIEW DATE (REVIEW COMPLETION) 1735  (UPDATE) 1736  (CANCEL) 1737

FIG. 20

- 1800
- 1801 — TEST TARGET PERIOD: 2008/04/01~2009/03/31
- 1802 — COMPANY NAME: [ ]
- 1803 — TEST TARGET PROCESS
- 1804 — PROCESS ID: P0001
- 1805 — PROCESS NAME: SALES OF CONSUMABLE GOODS
- 1806 — TEST TARGET CONTROL
- 1807 — CONTROL ID: C0001
- 1808 — CONTROL NAME: GROUP LEADER'S APPROVAL    1809 — (TEST RESULT SHEET)
- 1810 — TEST EXECUTION PROCEDURE: ○QUESTION ○OBSERVATION ●BROWSE ○CHECK
- 1811 — EXECUTION CONTENT: [ 1822 ]
- 1812 — NUMBER OF SAMPLES: 50    EXTRACTION METHOD: ●AUTOMATIC ○MANUAL
- 1813 — EXECUTION PERSON: [ ]
- 1814 — EXECUTION PERIOD: 2008/11/01~2008/11/30
- 1815 — DIFFERENCE FROM PLAN: ●DIFFERENT ○NONE    DIFFERENCE CONTENT: [ ]
- 1816 — TEST RESULT NUMBER: | NUMBER OF TESTS (1817) | OK (1823) | NG (1818) | 1819
- 1820 — RESULT: ●OK ○NG
- 1821 — COMMENT: [ ]
- 1830
- 1831 — REVIEW RESULT: ●OK ○NG
- 1832 — REVIEWER COMMENT: [ ]
- 1833 — REVIEWER: [ ]    1834 — REVIEW DATE: [ ]

(REVIEW REQUEST) 1840    (UPDATE) 1898    (CANCEL) 1899

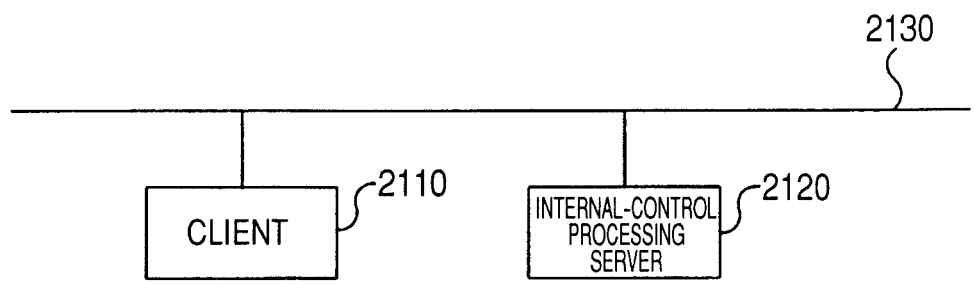
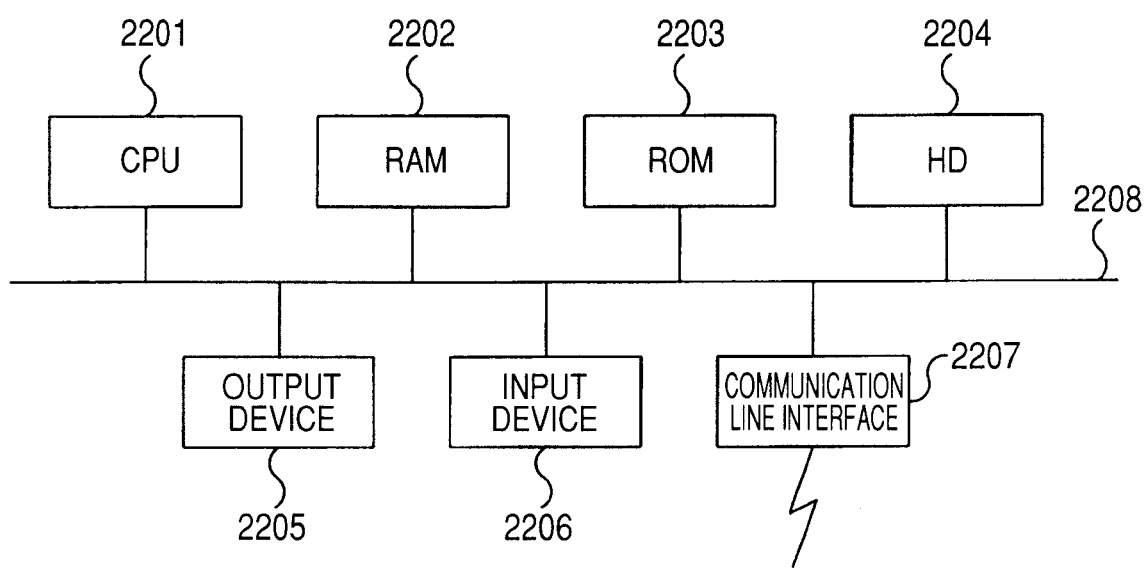

INFORMATION PROCESSING SYSTEM, INFORMATION PROCESSING METHOD AND COMPUTER READABLE MEDIUM

CROSS-REFERENCE TO RELATED APPLICATIONS

This application is based on and claims priority under 35 U.S.C. §119 from Japanese Patent Application No. 2006-273488 filed Oct. 4, 2007.

BACKGROUND

1. Technical Field

The invention relates to an information processing system, an information processing method, a computer readable medium storing an information processing program and a computer data signal embedded with the information processing program.

2. Related Art

In recent years, a financial internal control has been requested. As to the financial internal control, "internal control-integrated framework" announced by COSO (Treadway committee organizing committee) in 1992 has become a de facto standard and is defined as "a process that is executed by a board of directors, executives and other personnels and that is intended to provide a rational guarantee in order to achieve three objects of (1) effectiveness and efficiency of operations, (2) reliability of financial reporting, and (3) compliance with applicable laws and regulations.

In the financial internal control, enormous labor has been taken to manually operate and manage (i) organizing of a relationship among activity/system/resource/knowledge information and the like and (ii) construction of a mechanism for documenting a business process to make full use of the documents. As documents of the financial internal control, there are four documents, that is, a business process narrative, a business flow diagram, RCM (risk control matrix), a separation-of-duties table.

Also, in a financial internal control, there are two types of assessment for a document in which operations relevant to financial affairs are analyzed and a result of the analysis is summarized. That is, one is evaluation of design effectiveness (hereinafter, also referred to as walkthrough; simply referred to as 'WT') for checking the validity and the accuracy of the document, and the other is operation assessment for testing as to whether or not the operations are operated in compliance with the document. Since a large amount of time is required for works related to such assessment, it is necessary to efficiently perform the assessment.

In addition, since such assessment needs to be performed and reported every year while changing a test case, it has been difficult to promptly prepare a material from a large amount of data in the arranged form in association with details of annual assessment, a result thereof, problems left in previous years, and response methods therefor.

SUMMARY

According to an aspect of the invention, an information processing system includes a receiving unit, a risk control matrix storage unit and a dummy control setting unit. The receiving unit receives assumed risks and controls corresponding to the assumed risks. The risk control matrix storage unit stores a risk control matrix in which a correspondence relation between the risks and the controls is described. If evaluation of design effectiveness is performed to check a document regarding an operation to be controlled in an internal control of operations and the dummy control setting unit determines that there is a risk having no control corresponding thereto in the risk control matrix stored in the risk control matrix storage unit, the dummy control setting unit sets a dummy control for the risk having no corresponding control in the risk control matrix and stores the risk control matrix.

BRIEF DESCRIPTION OF THE DRAWINGS

Exemplary embodiments of the invention will be described below in detail with reference to the accompanying drawings wherein:

FIG. 4 is an explanatory view illustrating an example of a screen of a walkthrough planning paper;

FIG. 8 is an explanatory view illustrating an example of a screen of a walkthrough detail sheet (plan);

FIG. 10 is an explanatory view illustrating an example of a screen of details of a control;

FIG. 11 is an explanatory view illustrating an example of a screen of test data setting;

FIG. 13 is an explanatory view illustrating an example of a screen of a remaining risk list;

FIG. 18 is an explanatory view illustrating an example of a screen of an operation-test planning paper.

FIG. 20 is an explanatory view illustrating an example of a screen of an operation-test procedure paper;

FIG. 23 is a block diagram illustrating an example of the configuration of the entire system; and FIG. 24 is a block diagram illustrating an example of the hardware configuration of a computer for realizing the exemplary embodiment.

DETAILED DESCRIPTION

Figure 1:
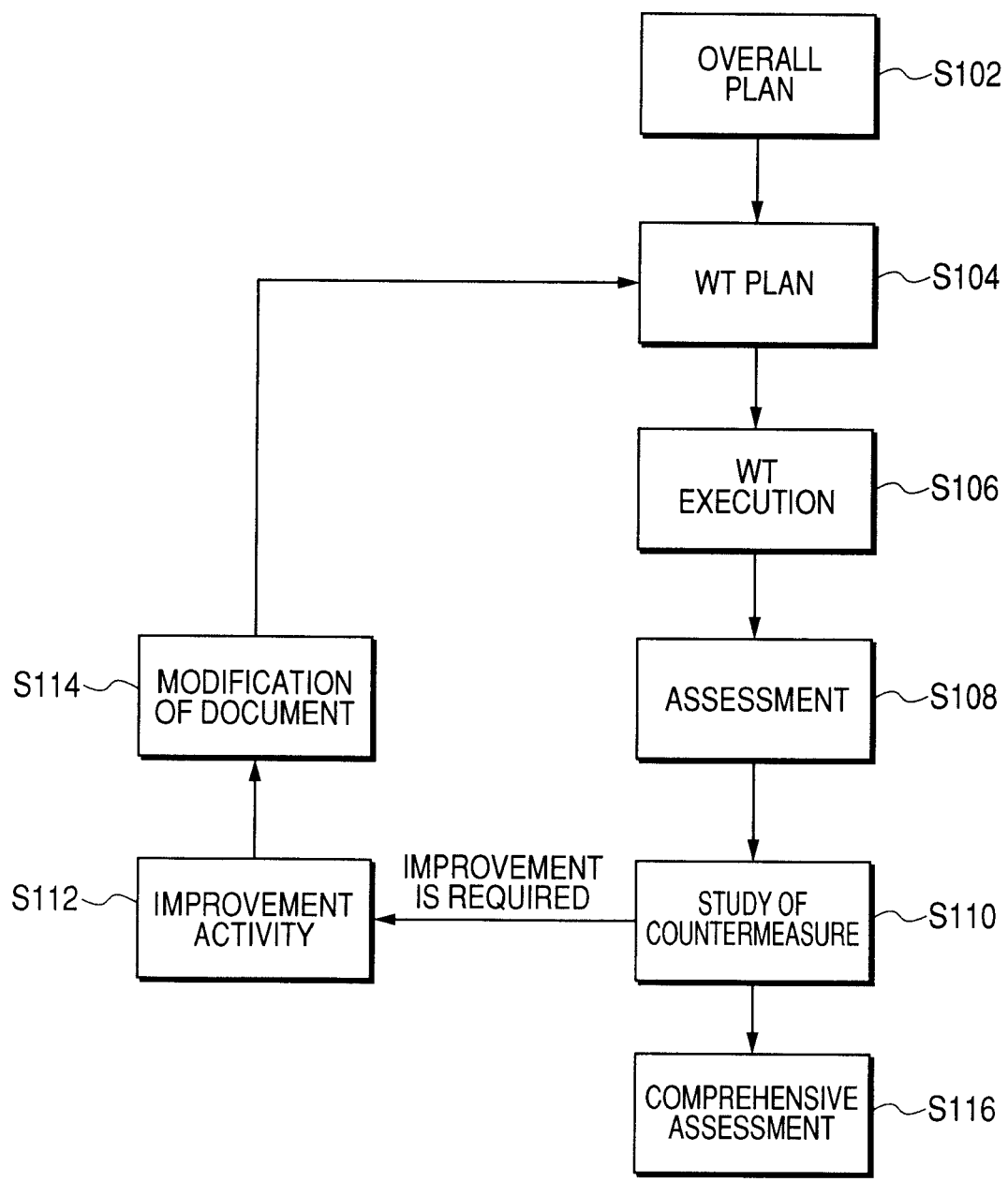
FIG. 1 is a flow chart illustrating an example of a basic flow in a walkthrough phase.

First, an explanation will be given of "basic four documents" of an inner control.

The basic four documents means basic documents formed for respective business processes which are targets of the financial inner control. Specifically, the basic four documents are a business process narrative, a business flow diagram, RCM (risk control matrix), a separation-of-duties table.

The business process narrative is also referred to as a "narrative." The business process narrative is one in to which documented is a flow of a series of operations from start of dealings to final entry into the general ledger and report. Regulation documents such as personnel regulations and accounting task regulations are documents at a higher order of the task document, and revision thereof has an influence on the business process narrative. Further, a task manual is a document which is a lower order of the business process narrative and receives the influence on the revision.

The business flow diagram is one obtained by visually forming a flow of the series of operations from start of dealings to final entry into the general ledger and report, into a flowchart. Also risks and controls are arranged on this flow.

RCM (risk control matrix) is one in which essential points (assertion) in view of controls to be achieved, assumed risks, corresponding inner control activities are summarized as a table with regard to the inner control activities related to a business process.

The separation-of-duties table is one used to check as to whether processes dealt with by the same person in charge overlap each other, which become an issue in view of a financial control in the flow of the business process.

Further, assertion is a premise condition based on which it can be said that financial information is reliable information. Specifically, six items of existence, comprehensiveness, evaluation, right-and-obligation, term/distribution and display are generally used as the "assertion." These items are partially changed by respective corporations or auditing corporations. Therefore, the items may be customized.

A risk means an impediment to assertion assumed in a business process.

A control means an inner control activity against risk. As a type of the control, there are preventive, discovering and the like.

Hereinafter, exemplary embodiments of the invention will be described with reference to the accompanying drawings.

In the financial internal control, a business process is documented by arranging relationships among activity/system/resource/knowledge data, for example, and a system for utilizing the documents is established. Although such a system is established independently for each company, one system may be established so as to be also utilized in associated companies (including subsidiary companies, a parent company, and the like).

Referring to FIG. 23, a configuration example of the entire system for walkthrough of a financial internal control or operation assessment to realize the exemplary embodiment will be described.

The whole system is configured to include a client 2110 and an internal-control processing server 2120. In addition, each component may plural ones. The client 2110 and the internal-control processing server 2120 are connected with each other through a communication line 2130. Data communicated between the client 2110 and the internal-control processing server 2120 is described in an XML (extensible markup language), and client 2110 and the internal-control processing server 2120 are connected with each other using a communication protocol, such as HTTP (hyper text transfer protocol).

The client 2110 has a function of a user interface that allows an operator to use the internal-control processing server 2120.

In order to execute the walkthrough or the operation assessment in the internal control, the internal-control processing server 2120 causes the client 210 to display a screen (for example, a WT planning paper screen 400), which is used to input an assessment plan and the like.

With reference to FIGS. 1 to 12, the exemplary embodiment for performing the evaluation of design effectiveness (the walkthrough) of the financial internal control for checking validity or effectiveness of a document created for the financial internal control will be described.

An example of a basic flow in a walkthrough phase will be described with reference to FIG. 1.

In step S102, a person in charge of the financial internal control creates an overall plan of the financial internal control.

In step S104, the person in charge creates a plan of the walkthrough using the exemplary embodiment. In this case, a planning paper and a WT detail sheet (plan) are used.

In step S106, the person in charge performs the walkthrough using the exemplary embodiment. In this case, a procedure paper and a WT detail sheet (execution) are used.

In step S108, the person in charge performs assessment based on a result of the walkthrough using the exemplary embodiment. In this case, an assessment paper is used.

At step S110, the person in charge studies a countermeasure based on the assessment on the result of the walkthrough. If the person in charge determines that improvement is required, the process proceeds to step S112. Otherwise, the process proceeds to step S116.

In step S112, an improvement activity is performed by the person in charge. For example, study as to how to modify which part of which document is performed based on the assessment in step S108.

In step S114, the person in charge modifies and revises the document as the improvement activity using the exemplary embodiment. Then, the process returns to step S104.

In step S116, the person in charge performs comprehensive assessment on the document for the financial internal control and the like for which the walkthrough activity and the countermeasure have been performed.

Next, an example of the configuration of conceptual modules according to the exemplary embodiment which are used when performing the walkthrough will be described with reference to FIG. 2.

Modules generally refer to logically separable components, such as software and hardware. Therefore, a module in the exemplary embodiment indicates not only a module in a program but also a module in the hardware configuration. Thus, description of the exemplary embodiment also serves as description of a method, a program and a system. Moreover, a module corresponds to a function in almost one-to-one correspondence manner. However, at the time of mounting, one module may be realized using one program or plural modules may be realized using one program. Alternatively, one module may be realized using plural programs. In addition, plural modules may be executed on one computer, or one module may be executed by plural computers in a distribution or parallel environment. In addition, in the following description, 'connection' includes logical connection as well as physical connection. For example, 'data is connected with other data' means that a part of data is the same data, one data indicates the other data through a pointer or link, and the like.

Further, a system may be realized by connecting plural computers, hardware, and apparatuses to one another using a network or may be realized using a single computer, a single hardware, or an single apparatus.

Furthermore, a term called 'input' may be used when receiving data by an operator's operation of the client 2110 or the internal-control processing server 2120, or may be used when each module receives data from other modules, for example.

Figure 2:
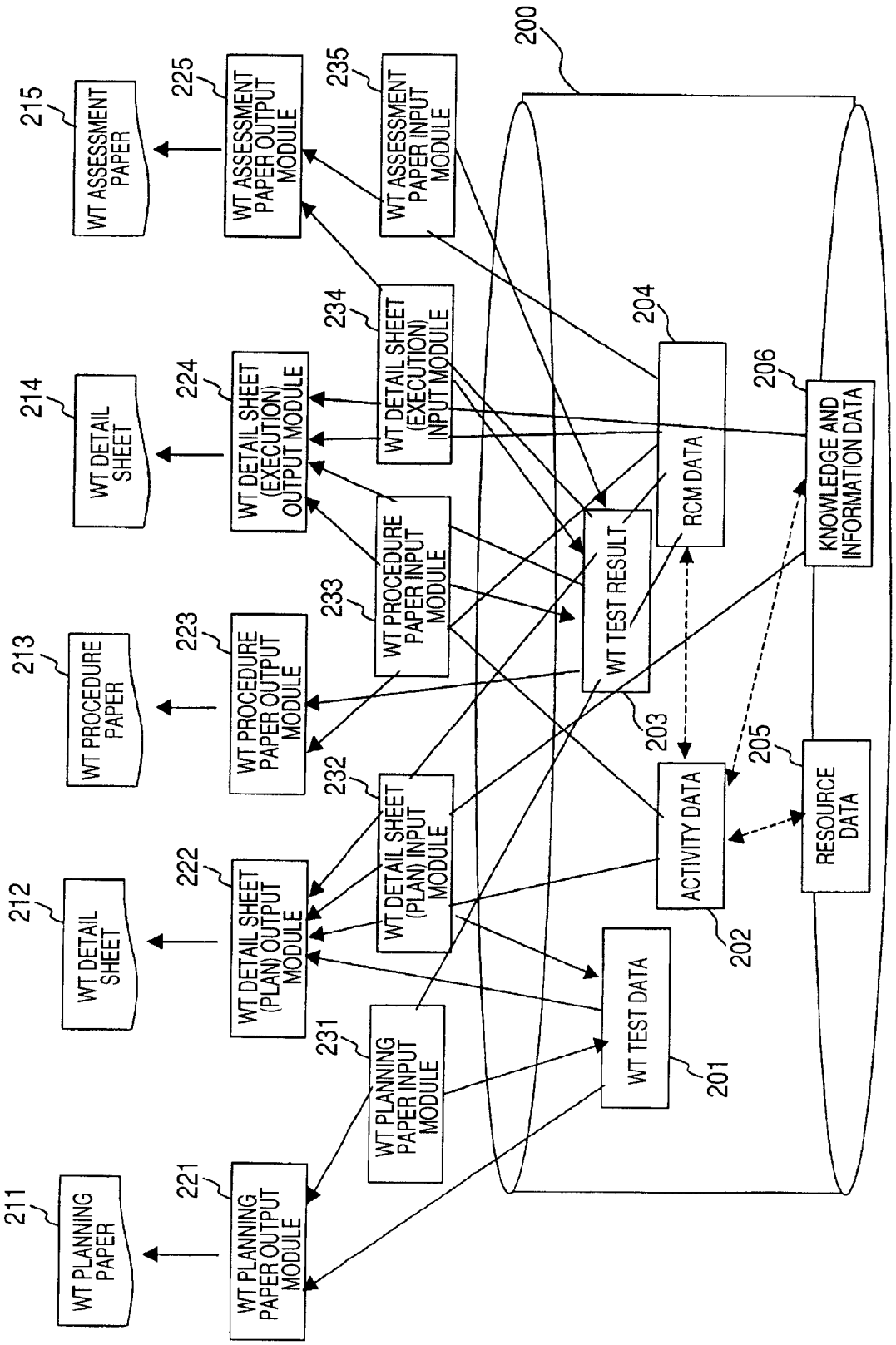
FIG. 2 is a block diagram illustrating an example of the configuration of modules in an exemplary embodiment.

As shown in FIG. 2, WT test data 201, activity data 202, a WT test result 203, RCM data 204, resource data 205, and knowledge and information data 206 are stored in a database 200. The respective data may be managed by separate databases or t by one database.

The WT test data 201 is connected with a WT planning paper output module 221, a WT detail sheet (plan) output module 222, a WT planning paper input module 231, and a WT detail sheet (plan) input module 232. The activity data 202 is connected with the WT detail sheet (plan) output module 222, a WT detail sheet (execution) output module 224, the RCM data 204, the resource data 205, and the knowledge and information data 206. The WT test result 203 is connected with a WT procedure paper output module 223, the WT detail sheet (execution) output module 224, a WT assessment paper output module 225, a WT procedure paper input module 233, a WT detail sheet (execution) input module 234, and a WT assessment paper input module 235. The RCM data 204 is connected with the WT planning paper output module 221, the WT detail sheet (plan) output module 222, the WT procedure paper output module 223, the WT detail sheet (execution) output module 224, the WT assessment paper output module 225, and the activity data 202. The resource data 205 is connected with the activity data 202. The knowledge and information data 206 is connected with the WT detail sheet (plan) output module 222, the WT detail sheet (execution) output module 224, and the activity data 202.

Modules for inputting data to the database 200 include the WT planning paper input module 231, the WT detail sheet (plan) input module 232, the WT procedure paper input module 233, the WT detail sheet (execution) input module 234, and the WT assessment paper input module 235. The WT planning paper input module 231 is connected with the WT test data 201. The WT detail sheet (plan) input module 232 is connected with the WT test data 201. The WT procedure paper input module 233 is connected with the WT test result 203. The WT detail sheet (execution) input module 234 is connected with the WT test result 203. The WT assessment paper input module 235 is connected with the WT test result 203.

Modules for outputting data from the database 200 include the WT planning paper output module 221, the WT detail sheet (plan) output module 222, the WT procedure paper output module 223, the WT detail sheet (execution) output module 224, and the WT assessment paper output module 225. The WT planning paper output module 221 is connected with the WT test data 201 and the RCM data 204 and outputs a WT planning paper 211. The WT detail sheet (plan) output module 222 is connected with the WT test data 201, the activity data 202, the RCM data 204, and the knowledge and information data 206 and outputs a WT detail sheet 212. The WT procedure paper output module 223 is connected with the WT test result 203 and the RCM data 204 and outputs a WT procedure paper 213. The WT detail sheet (execution) output module 224 is connected with the activity data 202, the WT test result 203, the RCM data 204, and the knowledge and information data 206 and outputs a WT detail sheet 214. The WT assessment paper output module 225 is connected with the WT test result 203 and the RCM data 204 and outputs a WT assessment paper 215.

Next, an example of relationship among data in the database 200 will be described in detail with reference to FIG. 3.

Figure 3:
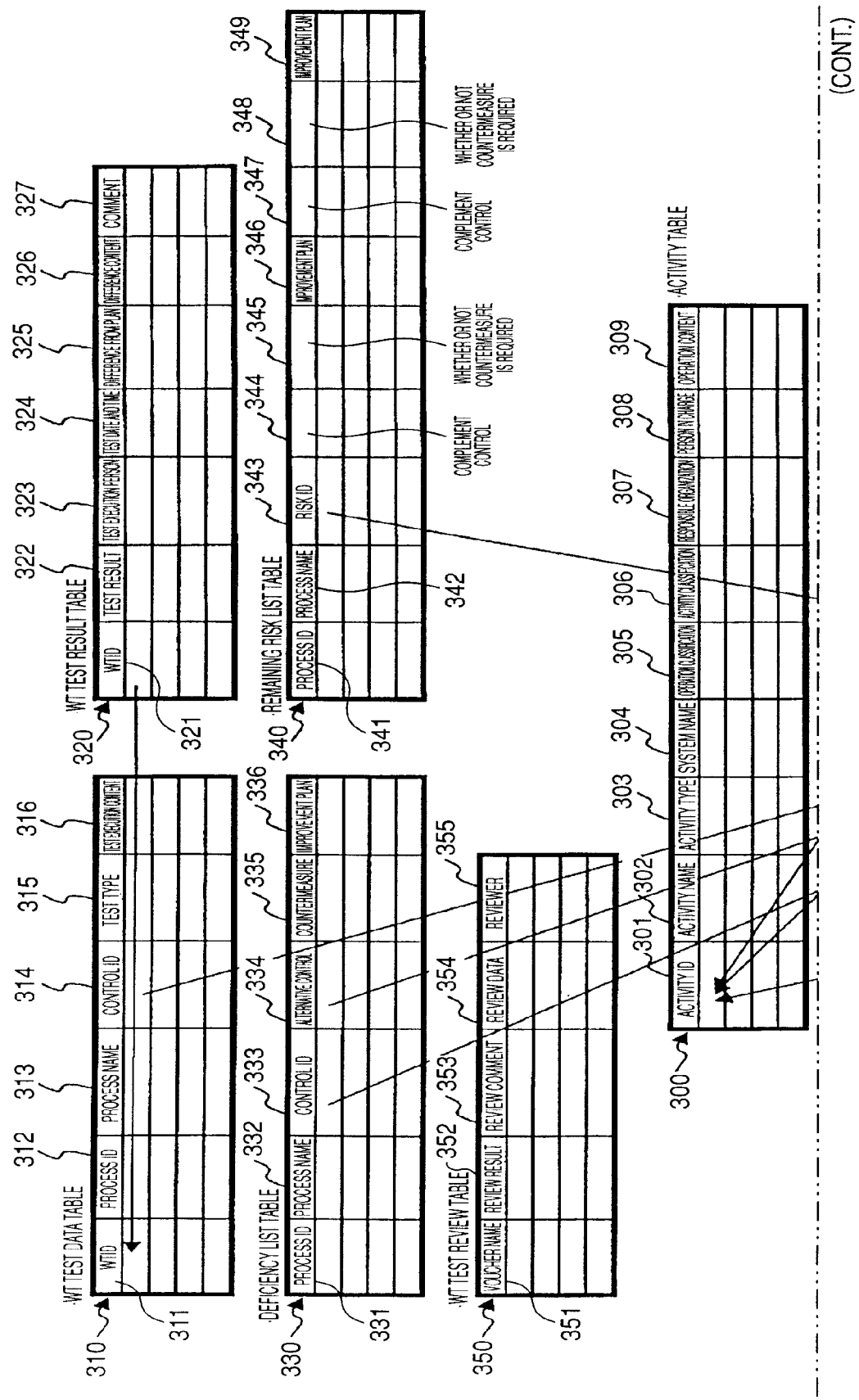
FIG. 3 is an explanatory view illustrating a relationship among tables used in the exemplary embodiment.

FIG. 3 illustrates relationships among an activity table 300, a WT test data table 310, a WT test result table 320, a deficiency list table 330, a remaining risk list table 340, a WT test review table 350, an RCM 360, a risk table 370, a control table 380, and a knowledge and information table 390. It is noted that columns in each table are only examples. Another column may be added so that other information can be stored.

The activity table 300 corresponds to the activity data 202 shown in FIG. 2. The activity table 300 includes an activity ID column 301, an activity name column 302, an activity type column 303, a system name column 304, an operation classification column 305S, an activity classification column 306, a responsible organization column 307, a person-in-charge column 308, and an operation content column 309. Activity IDs stored in the activity ID column 301 are identifiers that uniquely identify activities input by an operator, respectively. In addition, the activity IDs are also used in an activity ID column 374 of the risk table 370, an activity ID column 384 of the control table 380, and an activity ID column 394 of the knowledge and information table 390, and these tables are associated with the activity table 300.

The RCM 360, the risk table 370, and the control table 380 correspond to the RCM data 204 shown in FIG. 2. The RCM 360, the risk table 370, and the control table 380 as a whole store a risk control matrix in which assumed risks are associated with controls corresponding to the respective risks.

The risk table 370 includes a risk ID column 371, a risk name column 372, a risk content column 373, and an activity ID column 374. Risk IDs stored in the risk ID column 371 of the risk table 370 are identifiers that uniquely identify respective risks. The risk IDs are also used in a risk ID column 361 of the RCM 360 and a risk ID column 343 of the remaining risk list table 340, and the risk table 370 is associated with the RCM 360 and the remaining risk list table 340.

The control table 380 includes a control ID column 381, a control name column 382, a control content column 383, an activity ID column 384, and a column 385 of a knowledge ID for trail. Control IDs stored in the control ID column 381 of the control table 380 are identifiers that uniquely identify respective controls. The control IDs are also used in a control ID column 362 of the RCM 360, a control ID column 314 of the WT test data table 310, a control ID column 333 of the deficiency list table 330, and an alternative control column 334 of the deficiency list table 330, and the control table 380 is associated with the RCM 360, the WT test data table 310, and the deficiency list table 330.

The RCM 360 includes the risk ID column 361 and the control ID column 362. This table associates the risk IDs and the control IDs with each other.

The knowledge and information table 390 correspond to the knowledge and information data 206 shown in FIG. 2.

The knowledge and information table 390 includes a knowledge ID column 391, a knowledge name column 392, a knowledge type column 393, and the activity ID column 394. Knowledge IDs stored in the knowledge ID column 391 of the knowledge and information table 390 are identifiers that uniquely identify respective pieces of knowledge. The knowledge IDs are also used in the column 385 of the knowledge ID for trail, and the knowledge and information table 390 is associated with the control table 380.

The WT test data table 310 corresponds to the WT test data 201 shown in FIG. 2.

The WT test table 310 includes a WT ID column 311, a process ID column 312, a process name column 313, the control ID column 314, a test type column 315, and a test execution content column 316. WT IDs stored in the WT ID column 311 of the WT test table 310 are identifiers that uniquely identify respective walkthroughs. The WT IDs are also used in a WT ID column 321 of the WT test result table 320, and the WT test data table 310 is associated with the WT test result table 320.

The WT test result table 320 corresponds to the WT test result 203 shown in FIG. 2.

The WT test result table 320 includes the WT ID column 321, a test result column 322, a test execution person column 323, a test date and time column 324, a difference-from-plan column 325, a difference content column 326, and a comment column 327.

The deficiency list table 330, the remaining risk list table 340, and the WT test review table 350 are included in the WT test result 203 shown in FIG. 2.

The deficiency list table 330 includes a process ID column 331, a process name column 332, the control ID column 333, the alternative control column 334, a countermeasure column 3351 and an improvement plan column 336. The remaining risk list table 340 includes a process ID column 341, a process name column 342, the risk ID column 343, a complement control column 344, a column 345 for indicating as to whether or not a countermeasure is required, an improvement plan column 346, a complement control column 347, a column 348 for indicating as to whether or not a countermeasure is required, and an improvement plan column 349. The WT test review table 350 includes a voucher name column 351, a review result column 352, a reviewer comment column 353, a review date column 354, and a reviewer column 355.

Next, an example of screens, which processing server 2120 displays on an output device, such as a display, of the internal-control processing server 2120, when performing walk-through for checking validity or effectiveness of a document that is created for the financial internal control will be described with reference to FIGS. 4 to 13. The walkthrough is a kind of assessment of the financial internal control.

An outline of the walkthrough is as follows.

Figure 5:
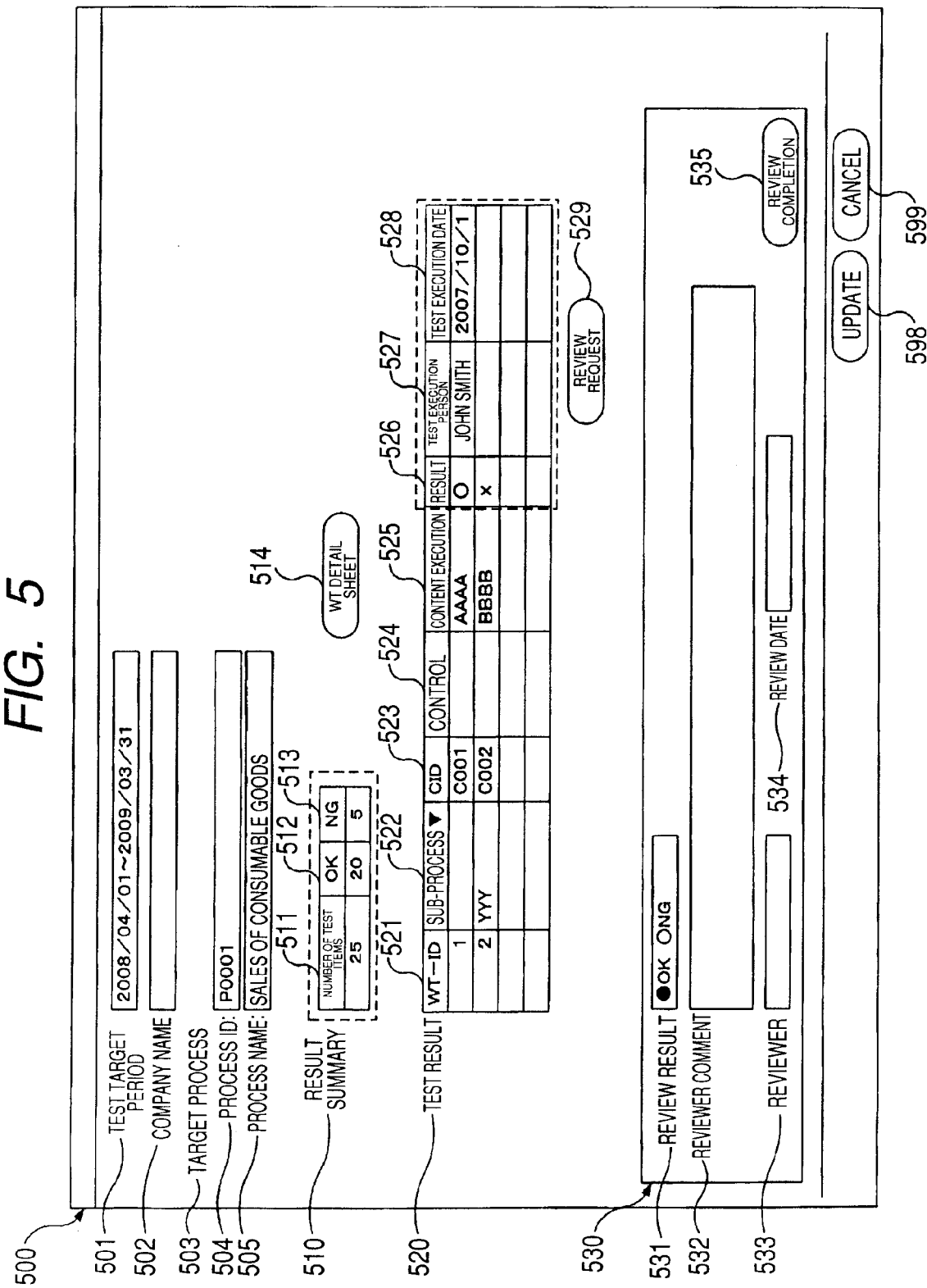
FIG. 5 is an explanatory view illustrating an example of a screen of a walkthrough procedure paper.
Figure 6:
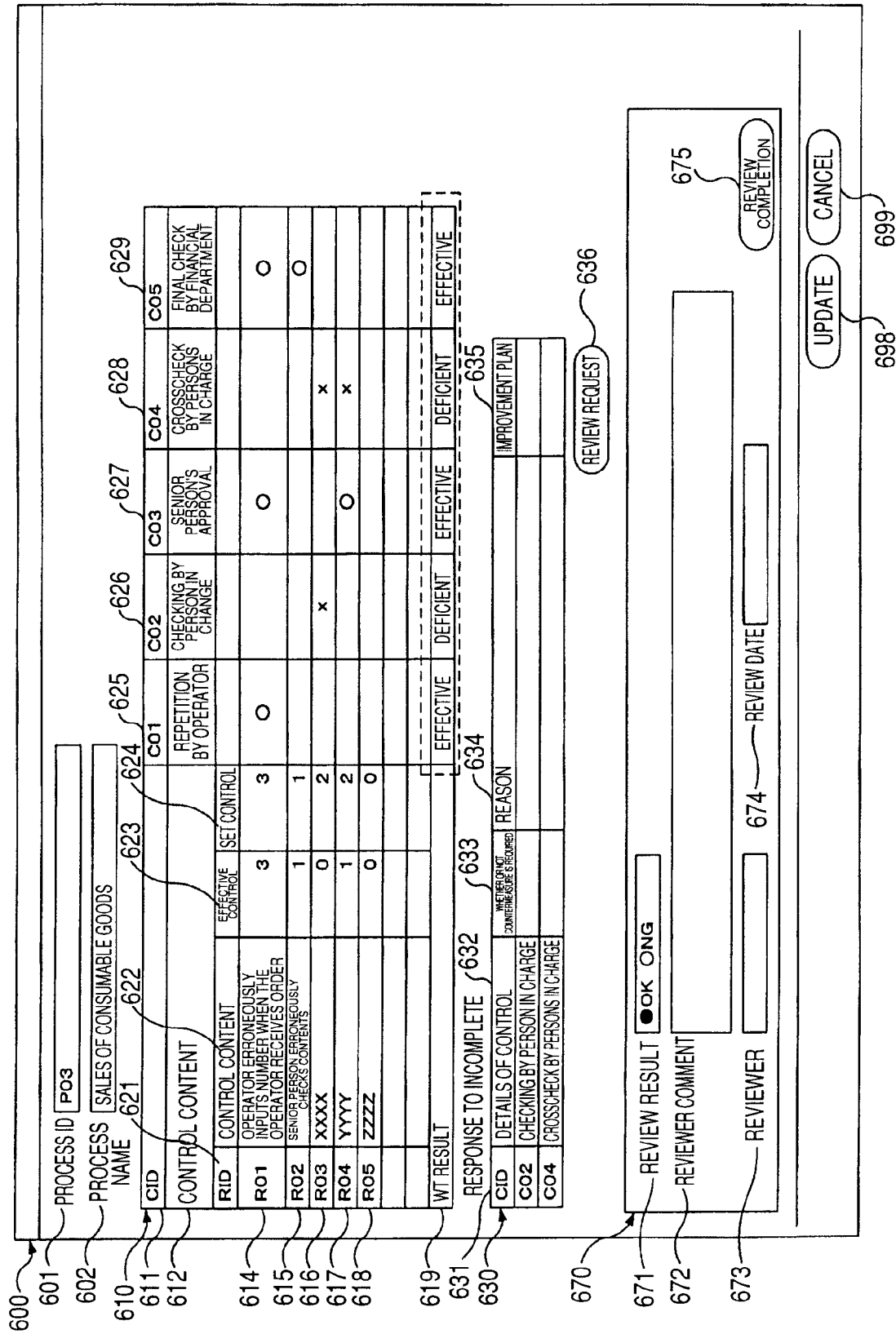
FIG. 6 is an explanatory view illustrating an example of a screen of a walkthrough assessment paper.
Figure 7:
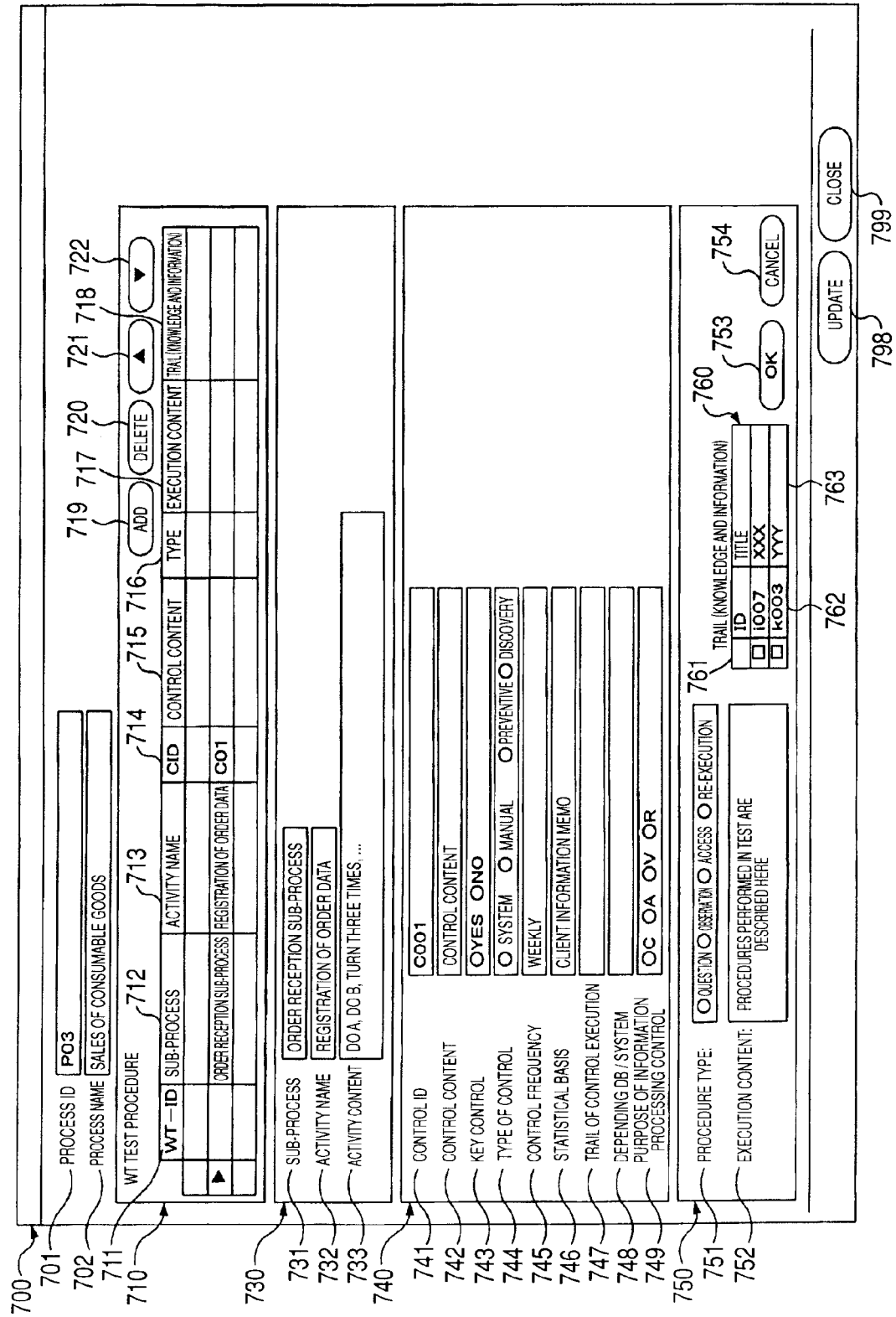
FIG. 7 is an explanatory view illustrating an example of a screen of a walkthrough detail sheet (plan)
Figure 9:
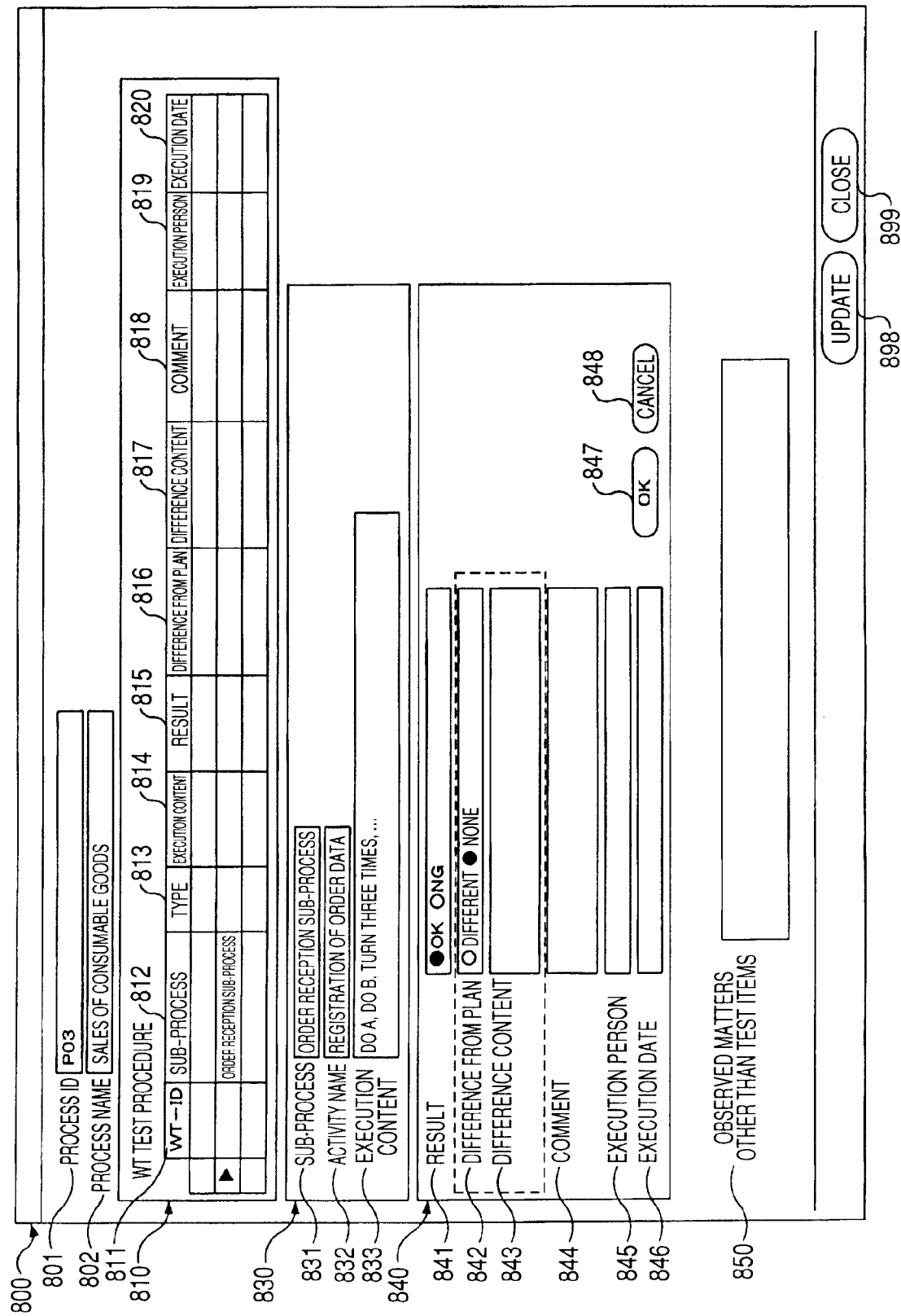
FIG. 9 is an explanatory view illustrating an example of a screen of a walkthrough detail sheet (execution)

Using four documents created for the financial internal control and data which is stored as a database and which is a basis of the four documents (elements such as the RCM data 204, the resource data 205 and the knowledge and information data 206; and the activity data 202 serving as key data thereof), test contents and WT plan contents for planning walkthrough (WT planning paper screen 400 shown in FIG. 4 and a WT detail sheet (plan) screen 700 shown in FIG. 7) are input, a WT test result for carrying out the walkthrough is input (see a WT procedure paper screen 500 shown in FIG. 5 and a WT detail sheet (execution) screen 800 shown in FIG. 9), and a test result of WT is assessed (see a WT assessment paper screen 600 shown in FIG. 6). A deficiency list and a remaining risk list are output as a comprehensive assessment of the walkthrough (a deficiency list screen 1100 shown in FIG. 12 and a remaining risk list screen 1200 shown in FIG. 13).

FIG. 4 is an explanatory view illustrating an example of a screen of the walkthrough planning paper.

A documentation process is designated by an operator's operation, and evaluation of design effectiveness is executed. Then, an input screen of the WT planning paper screen 400 is displayed.

A test target period column 401 is displayed, and input of period data (for example, 2008/04/01 to 2009/03/31) by an operator's operation is received. Similarly, inputs to a column 431 of a person in charge of execution, a reviewer column 432, a test period column 433, and a review period column 434 are received.

Furthermore, a company name column 402, a process ID column 404 and a process name column 405 of a target process 403, a total control number column 406, a planned control number column 407, an achievement ratio column 408, and a test execution plan column 410 are displayed on the basis of the period data input to the test target period column 401 by using the data stored in the database 200. The test execution plan 410 includes a control ID column 411, a control column 412, a plan content column 413, and a comment column 414.

Information about a control of the documentation process is displayed in the control column 412 on the basis of the RCM data 204 stored in the database 200.

The total control number, the planned control number, and an achievement ratio are calculated and displayed in the total control number column 406, the planned control number column 407, and the achievement ratio column 408.

When the WT detail sheet button 409 is pressed by an operator's operation, the WT detail sheet (plan) screen 700 is displayed.

When a cell of control in the control column 412 is designated by an operator's operation, a control detail screen 900 is displayed.

As to a test for every control, non-execution of a plan (non-creation of a plan may be included) may be displayed in a different form (for example, with a red color or in a blinking manner) from other displays.

Referencing to the RCM data 204 (especially, the RCM 360, the risk table 370, and the control table 380) stored in the database 200, a dummy control is automatically set for a risk that does not have a control, and a plan is brought in a unset state so to prevent input omission of control. Furthermore, a message indicating a control additionally created is displayed in the remarks column 414 in a different form (for example, with a red color or in a blinking manner) from other displays. A risk for which a control is not defined is extracted from the RCM data 204 created by documentation of the four basic documents. Moreover, in the case where there is a risk stored in the RCM data 204 which does not have a corresponding control, a dummy control is set therefor. Then, in the case where the dummy control is set, data (for example, a message indicating a plan is not unset) indicating that the set control is a dummy is set.

Specifically, this means the case where no control in the vertical axis direction corresponds to a risk in the horizontal axis direction in the table form of the risk and control matrix. In this case, since a risk is not controlled, setting of a control is needed. First, a control is automatically created by a system, and null data is added as a content of the control at this time point. The null data will be defined by the operator later.

In order to cause the WT plan to be reviewed, an E-mail is transmitted to a reviewer by pressing of a review request button 415 which is an operator's operation.

The review request allows the reviewer to perform input to a review result column 421, a reviewer comment column 422, a reviewer column 423, and a review date column 424 in a review screen 420. That is, items in the review screen 420 are activated. A review is fixed by pressing of a review completion button 425 which is a reviewer's operation.

In addition, when a close button 499 is pressed by an operator's operation, the WT planning paper screen 400 is closed to terminate processing.

FIG. 5 is an explanatory view illustrating an example of a screen of the walkthrough procedure paper.

Referencing to data such as the WT test data 201 stored in the database 200, a test target period column 501, a company name column 502, a process ID column 504 and a process name column 505 of a target process 503, a result summary 510, and a test result 520 are displayed in the WT procedure paper screen 500. The result summary 510 includes a test item number column 511, an OK column 512, and an NG column 513. The test result 520 displays a WT ID column 521, a sub-process column 522, a control ID column 523, a control column 524, an execution content column 525, a result column 526, a test execution person column 527, and a test execution date column 528.

When the WT detail sheet button 514 is pressed by an operator's operation, the WT detail sheet (plan) screen 700 is displayed.

The total number of test items is displayed in the test item number column 511 on the basis of test contents input from the WT planning paper screen 400 and the WT detail sheet (plan) screen 700. A test result input from the WT detail sheet (execution) screen 800 is displayed in the OK column 512 and the NG column 513.

In order to cause the WT procedure paper to be reviewed, an E-mail is transmitted to the reviewer by pressing of a review request button 529 which is an operator's operation.

The review request allows the reviewer to input to a review result column 531, a reviewer comment column 532, a reviewer column 533, and a review date column 534 in a review screen 530. That is, items in the review screen 530 are activated. A review is fixed by pressing of a review completion button 535 which is a reviewer's operation.

In addition, when an update button 598 is pressed by an operator's operation, data stored in the database 200 is updated with contents input in the current WT procedure paper screen 500. In addition, when a cancel button 599 is pressed by an operators operation, the contents input in the current WT procedure paper screen 500 are cancelled to return to a previous state.

FIG. 6 is an explanatory view illustrating an example of a screen of the walkthrough assessment paper.

Referencing to the data such as the WT test data table 310, the WT test result table 320 and the WT test data 201 stored in the database 200, a process ID column 601, a process name column 602, a risk control matrix 610, and a response to a deficient control 630 are displayed in the WT assessment paper screen 600.

The risk control matrix 610 is displayed in a matrix form. In the risk control matrix 610, risks are displayed in rows and controls are display in columns. The risks include an R01 column 614, an R02 column 615, an R03 column 616, an R04 column 617, and an ROS column 618, and the controls include a C01 column 625, a C02 column 626, a C03 column 627, a C04 column 628, and a C05 column 629. Each risk includes a risk ID column 621 indicating an identifier of each risk, a risk content column 622 that explains each risk, an effective control column 623 indicating the number of effective controls (the total number of cells in which 'O' is displayed) with respect to each risk, and a set control column 624 indicating the number of controls (the total number of cells in which 'O' or 'x' is displayed) which are set for each risk. Each control includes a control ID column 611 indicating an identifier of each control and a control content column 612 that explains each control. In a cell where a row of a risk and a column of a control cross, 'O' is displayed to indicate that a test result of a corresponding control is OK and 'x' is displayed to indicate that a test result of a corresponding control is NG. In particular, the WT test data table 310 and the WT test result table 320 stored in the database 200 are referenced to display 'O' or 'x.' That is, information as to whether or not each control is performed is displayed using in units of risks on the basis of the assessment result and risks which are stored in the RCM data 204 and which correspond to each control.

In addition, a result (effective, deficient) of the walkthrough with respect to each control is displayed in a WT result column 619.

Furthermore, in the risk control matrix 610, a risk (the R03 column 616 in the example shown in FIG. 6) having no OK as a result of the test is displayed in a different form (for example, with a red color or in a blinking manner) from other displays as a problematic risk, in order to indicate that a control cannot be made.

In addition, a cell of each control and the control detail screen 900 corresponding to each control are linked to each other. Accordingly, when an operator clicks on a cell of a control, the control detail screen 900 corresponding to the control is displayed.

The response to deficient control 630 includes a control ID column 631, a control content column 632, a column 633 for indicating as to whether or not a countermeasure is required, a reason column 634, and an improvement plan column 635, and a deficient control (or a control displayed with an 'x' mark) is listed. An identifier of the deficient control is displayed in the control ID column 631, and an explanation thereof is displayed in the control content column 632. Moreover, the response to deficient control 630 is configured so that for each deficient control, inputs can be made to the column 633 for indicating as to whether or not a countermeasure is required and the improvement plan column 635. In addition, each cell of the improvement plan column 635 and a document regarding an improvement plan are linked to each other. Accordingly, when an operator clicks on a cell of the improvement plan column 635, a corresponding document regarding the improvement plan is displayed.

In order to cause the WT assessment paper to be reviewed, an E-mail is transmitted to the reviewer by pressing of a review request button 636 which is an operator's operation.

The review request allows the reviewer to perform input to a review result column 671, a reviewer comment column 672, a reviewer column 673, and a review date column 674 in a review screen 670. That is, items in the review screen 670 are activated A review is fixed by pressing of a review completion button 675 which is a reviewer's operation.

In addition, when an update button 698 is pressed by an operator's operation, the data stored in the database 200 is updated with contents input in the current WT assessment paper screen 600. In addition, when a cancel button 699 is pressed by an operator's operation, the contents input in the current NT assessment paper screen 600 are cancelled to return to a previous state.

FIGS. 7 and 8 are explanatory views illustrating an example of a screen of the walkthrough detail sheet (plan).

Referencing to data, such as the activity data 202 and the RCM data 204, stored in the database 200, a process ID column 701, a process name column 702, a WT test procedure 710, a sub-process screen 730, a control screen 740, and a procedure screen 750 are displayed on the WT detail sheet (plan) screen 700.

The WT test procedure 710 includes a WT ID column 711, a sub-process column 712, an activity name column 713, a control ID column 714, a control content column 715, a type column 716, a execution content column 717, and a trail (knowledge and information) column 718.

When an addition button 719 is pressed by an operator's operation, a screen for selection of a test target control shown in FIG. 8 is displayed with referencing to the RCM data 204 stored in the database 200. When a control displayed on the screen shown in FIG. 8 is checked by the operator's operation, the control is added in the WT test procedure 710.

When a deletion button 720 is pressed by an operator's operation, a current line of the WT test procedure 710 is deleted from the walkthrough. In addition, when an upward movement button 721 or a downward movement button 722 is pressed by an operator's operation, the current line of the WT test procedure 710 is moved.

The sub-process screen 730 includes a sub-process column 731, an activity name column 732, and an activity content column 733. On the sub-process screen 730, each control and information about an activity related to the control are displayed with referencing to data, such as the RCM data 204.

The control screen 740 includes a control ID column 741, a control content column 742, a key control column 743, a control type column 744, a control frequency column 745, a statistical basis column 746, a column 747 of trail of control execution, a depending DB/system column 748, and a column 749 of a purpose of information processing control. On the control screen 740' knowledge and information relevant to a control are displayed as trail information with referencing to data, such as the knowledge and information data 206, stored in the database 200.

The procedure screen 750 includes a procedure type column 751 (any of question, observation, access, and re-execution can be selected), an execution content column 752 and a trail (knowledge and information) 760. On the procedure screen 750, a procedure type and an execution content can be input as test data for each control.

The trail (knowledge and information) 760 includes a check column 761, an ID column 762, and a title column 763. Trail used for assessment can be selected in the check column 761, In addition, when an update button 798 is pressed by an operator's operation, data stored in the database 200 is updated with contents input in the current WT detail sheet (plan) screen 700. In addition, when a close button 799 is pressed by an operator's operation, the WT detail sheet (plan) screen 700 is closed to terminate the processing.

FIG. 9 is an explanatory view illustrating an example of a screen of the walkthrough detail sheet (execution).

Referencing to data, such as the WT test data 201, stored in the database 200, a process ID column 801, a process name column 802, a WT test procedure 810, a sub-process screen 830, an assessment result screen 840, and a column 850 of observed matters other than test items are displayed on the WT detail sheet (execution) screen 800.

The WT test procedure 810 includes a WT ID column 811, a sub-process column 812, a type column 813, an execution content column 814, a result column 815, a difference-from-plan column 816, a difference content column 817, a comment column 818, an execution person column 819, and an execution date column 820. Contents of the columns are displayed with reference to data, such as the WT test data 201, stored in the database 200.

The sub-process screen 830 includes a sub-process column 831, an activity name column 832, and an execution content column 833. On the sub-process screen 830, a test content corresponding to walkthrough that is selected in the WT the test procedure 810 by an operator and activity information related to the test are displayed.

The assessment result screen 840 includes a result column 841, a difference-from-plan column 842, a difference content column 843, a comment column 844, an execution person column 845, and an execution date column 846. On the assessment result screen 840, a result (OK/NG), a difference (Yes/None) from a plan, a difference content, a comment, an execution person, and an execution date can be input by an operator.

In the column 850 of observed matters other than test items, observed matters other than test items can be input as observed matter data.

In addition, when an update button 898 is pressed by an operator's operation, data stored in the database 200 is updated with contents input on the current WT detail sheet (execution) screen 800. In addition, when a close button 899 is pressed by an operator's operation, the WT detail sheet (execution) screen 800 is closed to terminate the processing.

FIG. 10 is an explanatory view illustrating an example of a screen of control details.

The control detail screen 900 is linked with a corresponding cell in the WT assessment paper screen 600. When a cell in the WT assessment paper screen 600 is selected by an operator's click, the corresponding control detail screen 900 is displayed.

A control table 910 and a test table 920 are displayed on the control detail screen 900 with referencing to data, such as the RCM data 204, stored in the database 200.

A control ID column 911, a control content column 912, a key control column 913, a control type column 914, a control frequency column 915, a statistical basis column 916, a column 917 of trail of control execution, a control ID column 918, and a column 919 of a purpose of information processing control are displayed in the control table 910.

The test table 920 mainly includes a test procedure column 921 and a test result column 924. The test procedure column 921 includes a type column 922 and an execution content column 923. The test result column 924 includes a result column 925, a difference-from-result column 926, a difference content column 927, and a comment column 928.

FIG. 11 is an explanatory view illustrating an example of a screen of test data setting.

A test data setting screen 1000 is linked with a corresponding cell in the WT assessment paper screen 600. When a cell in the WT assessment paper screen 600 is selected by an operator's click, the corresponding test data setting screen 1000 is displayed.

On the test data setting screen 1000, a test data table 1010 and a walkthrough screen 1020 are displayed with referencing to data, such as a WT test, stored in the database 200.

The test data table 1010 includes a WT ID column 1011, a resource (DB) name column 1012, a Serial-No (slip number) column 1013, and a remarks column 1014.

On the walkthrough screen 1020, a WT ID column 1021, a resource (DB) name column 1022, a Serial-No (slip number) column 1023, and a remarks column 1024 can be input by an operator.

In addition, when an OK button 1025 is pressed by an operator's operation, contents input on the current walkthrough screen 1020 are registered in the database 200 and a result is displayed in the test data table 1010. In addition, when a cancel button 1026 is pressed by an operator's operation, the contents input on the current walkthrough screen 1020 are cancelled to return to a previous state.

In addition, when an update button 1098 is pressed by an operator's operation, data stored in the database 200 is updated with contents input on the test data setting screen 1000. In addition, when a close button 1099 is pressed by an operator's operation, the test data setting screen 1000 is closed to terminate the processing.

Figure 12:
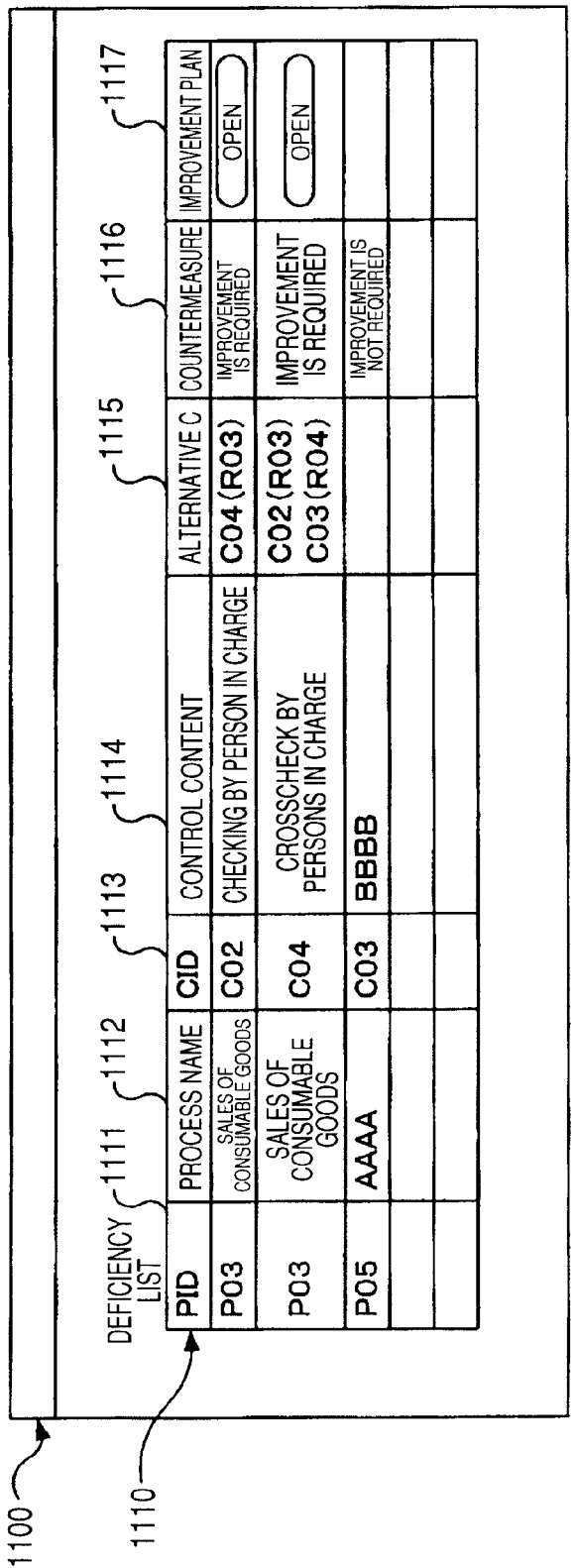
FIG. 12 is an explanatory view illustrating an example of a screen of a deficiency list.

FIG. 12 is an explanatory view illustrating an example of a screen of a deficiency list.

A deficiency list 1110 is displayed on a deficiency list screen 1100 with referencing to data, such as the deficiency list table 330, stored in the database 200. The deficiency list 1110 includes a process ID column 1111, a process name column 1112, a control ID column 1113, a control content column 1114, an alternative control column 1115, a countermeasure column 1116, and an improvement plan column 1117.

On the deficiency list screen 1100, a process ID, a process name, a control ID, and a control content all of which are related to a control corresponding to NG in the WT assessment paper (refer to FIG. 6) are displayed in the process ID column 1111, the process name column 1112, the control ID column 1113, and the control content column 1114, respectively.

In the alternative control column 1115, a list of alternative controls with which a target control can be replaced is displayed using the RCM data 204 stored in the database 200. In addition, existence of a countermeasure against a corresponding control and an improvement plan against the corresponding control are displayed in the countermeasure column 1116 and the improvement plan column 1117, respectively, so as to the operator input therein.

FIG. 13 is an explanatory view illustrating an example of a screen of a remaining risk list.

A remaining risk list 1210 is displayed on the remaining risk list screen 1200 with referencing to data, such as the remaining risk list table 340, stored in the database 200. The remaining risk list 1210 includes a process ID column 1211, a process name column 1212, a risk ID column 1213, a risk content column 1214, a complement control column 1215, a column 1216 for indicating whether or not a countermeasure is required, an improvement plan column 1217, a column 1218 for indicating financial importance, an occurrence probability column 1219, and a comprehensive assessment column 1220.

For each control belonging to the deficiency list (see FIG. 12), a process ID, a process name, a risk ID, a risk name, and indication as to whether or not a complement control exists which are all related to a risk that has no effective control are displayed in the process ID column 1211, the process name column 1212, the risk ID column 1213, the risk content column 1214, and the complement control column 1215, respectively, using data, such as the RCM data 204, stored in the database 200.

The indication as to whether or not a countermeasure is required, an improvement plan, financial importance, an occurrence probability, and comprehensive assessment regarding each risk are displayed in the column 1216 for indicating as to whether or not a countermeasure is required, the improvement plan column 1217, the column 1218 for indicating financial importance, the occurrence probability column 1219, and the comprehensive assessment column 1220, respectively, so as to allow the operation to input therein.

Next, the exemplary embodiment for performing operation assessment of the financial internal control will be described with reference to FIGS. 14 to 22.

Figure 14:
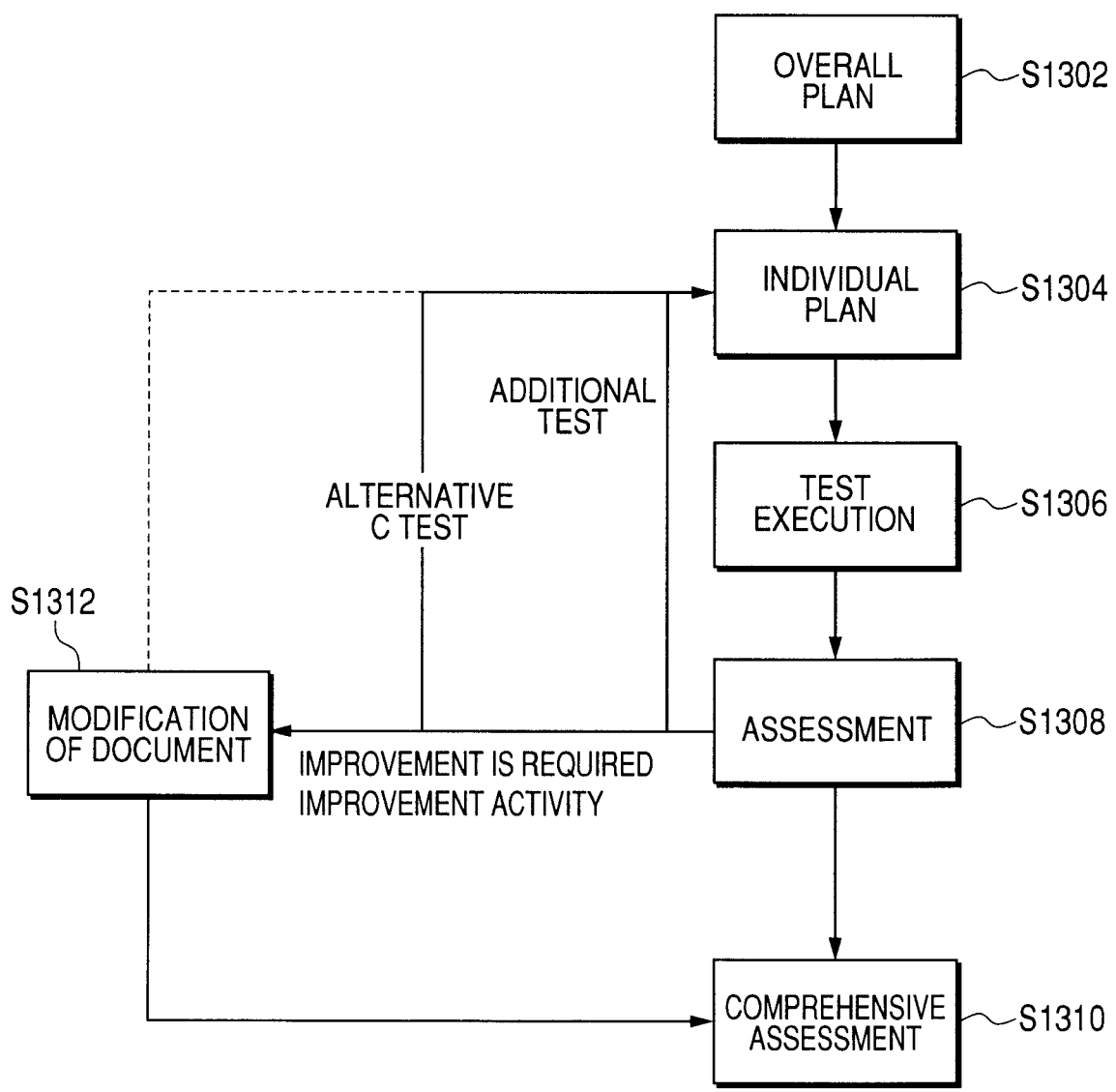
FIG. 14 is a flow chart illustrating an example of a basic flow in an operation assessment phase.

An example of a basic flow in an operation assessment phase will be described with reference to FIG. 14.

In step S1302, a person in charge of the financial internal control creates an overall plan of the financial internal control.

In step S1304, the person in charge creates individual plans of the operation assessment using the exemplary embodiment. In this case, a planning paper and a test detail sheet (plan) are used.

In step S1306, the person in charge carries out a test, which is the operation assessment, using the exemplary embodiment. In this case, a procedure paper and a test detail sheet (execution) are used.

In step S1308, the person in charge performs an assessment based on a result of the operation assessment using the exemplary embodiment. In this case, an assessment paper is used. If the person in charge determines that an improvement is required, the process proceeds to step S1312. If it is determined that an additional test is required, the process proceeds to step S1304 in order to perform operation assessment corresponding to another test item. If it is determined that an alternative control test is required, the process proceeds to step S1304 in order to perform operation assessment corresponding to another control. In other cases, the process proceeds to step S1310.

In step S1312, the person in charge modifies and revises a document as an improvement activity using the exemplary embodiment. Then, the process proceeds to step S1304 or step S1310.

In step S1310, the person in charge performs a comprehensive assessment about a document for the financial internal control for which the operation assessment activity and the countermeasures have been performed.

An example of the configuration of conceptual modules in the exemplary embodiment when performing the operation assessment will be described with reference to FIG. 15.

Figure 15:
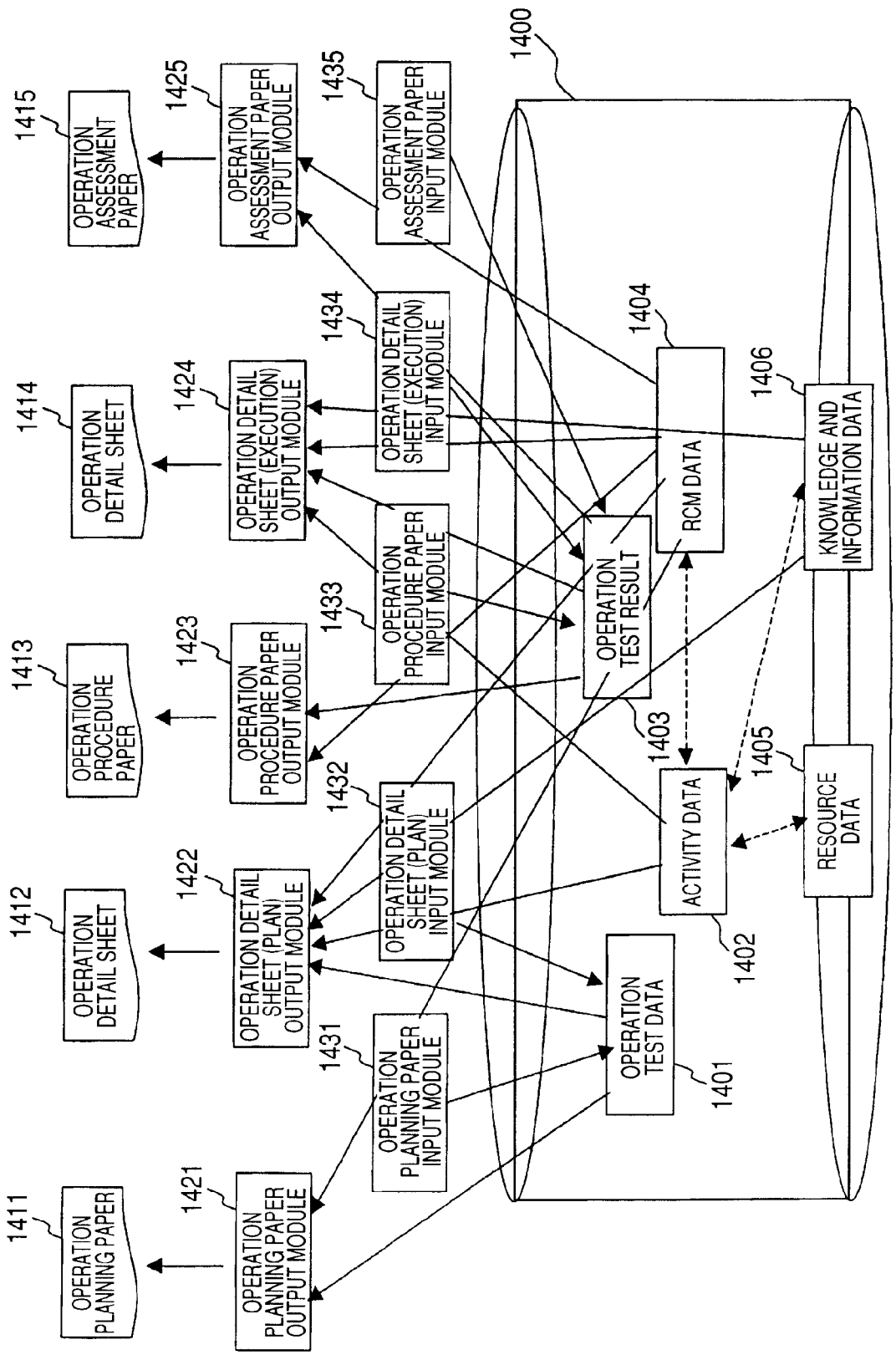
FIG. 15 is a block diagram illustrating an example of the configuration of modules according to the exemplary embodiment.

As shown in FIG. 15, operation test data 1401, activity data 1402, an operation test result 1403, RCM data 1404, resource data 1405, and knowledge and information data 1405 are stored in a database 1400. Each data may be managed by separate databases or may be managed by a single database.

The operation test data 1401 is connected with an operation planning paper output module 1421, an operation detail sheet (plan) output module 1422, an operation planning paper input module 1431, and an operation detail sheet (plan) input module 1432. The activity data 1402 is connected with the operation detail sheet (plan) output module 1422, an operation detail sheet (execution) output module 1424, the RCM data 1404, the resource data 1405, and the knowledge and information data 1406. The operation test result 1403 is connected with an operation procedure paper output module 1423, the operation detail sheet (execution) output module 1424, an operation assessment paper output module 1425, an operation procedure paper input module 1433, an operation detail sheet (execution) input module 1434, and an operation assessment paper input module 1435. The RCM data 1404 is connected with the operation planning paper output module 1421, the operation detail sheet (plan) output module 1422, the operation procedure paper output module 1423, the operation detail sheet (execution) output module 1424, the operation assessment paper output module 1425, and the activity data 1402. The resource data 1405 is connected with the activity data 1402. The knowledge and information data 1406 is connected with the operation detail sheet (plan) output module 1422, the operation detail sheet (execution) output module 1424, and the activity data 1402.

Modules for inputting data to the database 1400 include the operation planning paper input module 1431, the operation detail sheet (plan) input module 1432, the operation procedure paper input module 1433, the operation detail sheet (execution) input module 1434, and the operation assessment paper input module 1435. The operation planning paper input module 1431 is connected with the operation test data 1401. The operation detail sheet (plan) input module 1432 is connected with the operation test data 1401. The operation procedure paper input module 1433 is connected with the operation test result 1403. The operation detail sheet (execution) input module 1434 is connected with the operation test result 1403. The operation assessment paper input module 1435 is connected with the operation test result 1403.

Modules for outputting data from the database 1400 include the operation planning paper output module 1421, the operation detail sheet (plan) output module 1422, the operation procedure paper output module 1423, the operation detail sheet (execution) output module 1424, and the operation assessment paper output module 1425. The operation planning paper output module 1421 is connected with the operation test data 1401 and the RCM data 1404 and outputs an operation planning paper 1411. The operation detail sheet (plan) output module 1422 is connected with the operation test data 1401, the activity data 1402, the RCM data 1404, and the knowledge and information data 1406 and outputs an operation detail sheet 1412. The operation procedure paper output module 1423 is connected with the operation test result 1403 and the RCM data 1404 and outputs an operation procedure paper 1413. The operation detail sheet (plan) output module 1424 is connected with the activity data 1402, the operation test result 1403, the RCM data 1404, and the knowledge and information data 1406 and outputs an operation detail sheet 1414. The operation assessment paper output module 1425 is connected with the operation test result 1403 and the RCM data 1404 and outputs an operation assessment paper 1415.

Next, an example of relationship among data in the database 1400 will be described in detail with reference to FIG. 16.

Figure 16:
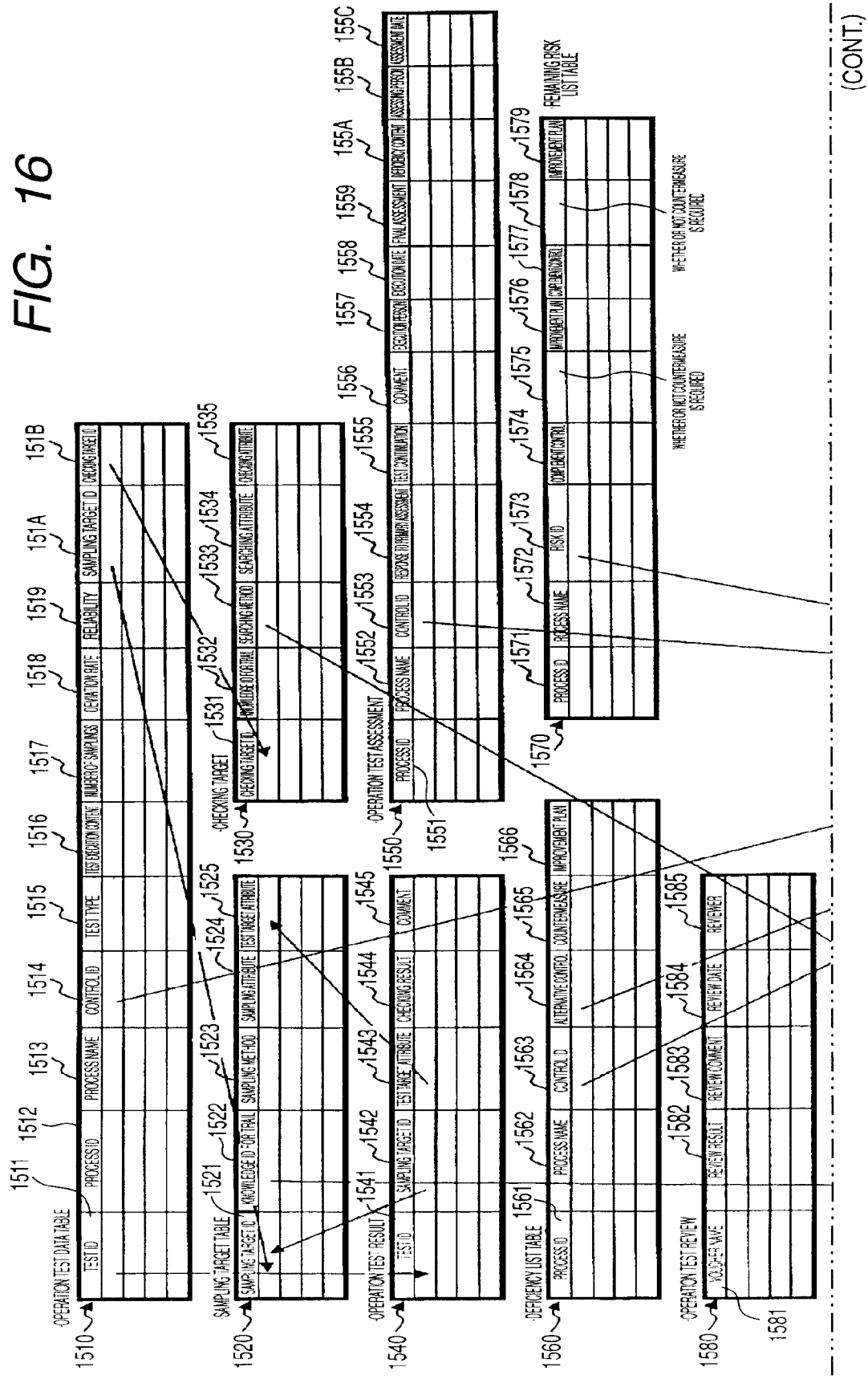
FIG. 16 is an explanatory view illustrating a relationship among tables used in the exemplary embodiment.

FIG. 16 illustrates the relationships among an activity table 1500, an operation test data table 1510, a sampling target table 1520, a checking target 1530, an operation test result table 1540, operation test assessment 1550, a deficiency list table 1560, a remaining risk list table 1570, an operation test review table 1580, an RCM 1590, a risk table 15A0, a control table 15B0, and a knowledge and information table 15C0. In addition, columns in each table are only examples, and another column may be added so that other information can be stored.

The activity table 1500 corresponds to the activity data 1402 shown in FIG. 15. The activity table 1500 includes an activity ID column 1501, an activity name column 1502, an activity type column 1503, a system name column 1504, an operation classification column 1505, an activity classification column 1506, a responsible organization column 1507, a person-in-charge column 1508, and an operation content column 1509. Activity IDs stored in the activity ID column 1501 are identifiers that uniquely identify respective activities input by an operator. In addition, the activity IDs are also used in an activity ID column 15A4 of the risk table 15A0, an activity ID column 15B4 of the control table 15B0, and an activity ID column 15C4 of the knowledge and information table 15C0, and these tables are associated with the activity table 1500.

The RCM 1590, the risk table 15A0 and the control table 15B0 correspond to the RCM data 1404 shown in FIG. 15.

The risk table 15A0 includes a risk ID column 15A1, a risk name column 15A2, a risk content column 15A3, and the activity ID column 15A4. Risk IDs stored in the risk ID column 15A1 of the risk table 15A0 are identifiers that uniquely identify respective risks. The risk IDs are also used in a risk ID column 1591 of the RCM 1590 and a risk ID column 1573 of the remaining risk list table 1570, and the risk table 15A0 is associated with the RCM 1590 and the remaining risk list table 1570.

The control table 15B0 includes a control ID column 15B1, a control name column 15B2, a control content column 15B3, the activity ID column 15B4, and a column 15B5 of a knowledge ID for trail. Control IDs stored in the control ID column 15B1 of the control table 15B0 are identifiers that uniquely identify respective controls. The control IDs are also used in a control ID column 1592 of the RCM 1590, a control ID column 1563 of the deficiency list table 1560, an alternative control column 1564 of the deficiency list table 1560, a control ID column 1514 of the operation test data table 1510, and a control ID column 1553 of the operation test assessment 1550, and the control table 15B0 is associated with the RCM 1590, the operation test data table 1510, the operation test assessment 1550, and the deficiency list table 1560.

The RCM 1590 includes the risk ID column 1591 and the control ID column 1592. By this table, the risk ID and the control ID are associated with each other.

The knowledge and information table 15C0 corresponds to the knowledge and information data 1406 shown in FIG. 15.

The knowledge and information table 15C0 includes a knowledge ID column 15C1, a knowledge name column 15C2, a knowledge type column 15C3, and the activity ID column 15C4. Knowledge IDs stored in the knowledge ID column 15C1 of the knowledge and information table 15C0 is identifiers that uniquely identify respective pieces of knowledge. The knowledge IDs are also used in a column 1522 of a knowledge ID for trail of the sampling target table 1520, a searching method column 1533 of the checking target 1530, and the knowledge ID 15B5 for trail of the control table 15B0, and the knowledge and information table 15C0 are associated with the sampling target table 1520, the checking target 1530, and the control table 15B0.

The operation test data table 1510 corresponds to the operation test data 1401 shown in FIG. 15.

The operation test data table 1510 includes a test ID column 1511, a process ID column 1512, a process name column 1513, the control ID column 1514, a test type column 1515, an execution content column 1516, a sampling number column 1517, a deviation rate column 1519, a reliability column 1519, a sampling target ID column 151A and a checking target ID column 151B.

The sampling target table 1520 is included in the operation test data 1401 shown in FIG. 15.

The sampling target table 1520 includes a sampling target ID column 1521, the column 1522 of a knowledge ID for trail, a sampling method column 1523, a sampling attribute column 1524, and a test target attribute column 1525. Sampling target IDs stored in the sampling target ID column 1521 of the sampling target table 1520 are identifiers that uniquely identify respective sampling targets. The sampling target IDs are also used in the sampling target ID column 151A of the operation test data table 1510 and a sampling target ID column 1542 of the operation test result table 1540, and the sampling target table 1520 is associated with the operation test data table 1510 and the operation test result table 1540. In addition, test target attribute IDs stored in the test target attribute column 1525 of the sampling target table 1520 are identifiers that uniquely identify respective test target attributes. The test target attribute IDs are also used in a test target attribute column 1543 of the operation test result table 1540, and the sampling target table 1520 is associated with the operation test result table 1540.

The checking target 1530 is included in the operation test data 1401 shown in FIG. 15.

The checking target 1530 includes a checking target ID column 1531, a column 1532 of a knowledge ID for trail, the searching method column 1533, a searching attribute column 1534, and a checking attribute column 1535. Checking target IDs stored in the checking target ID column 1531 of the checking target 1530 are identifiers that uniquely identify respective checking targets. The checking target IDs are also used in the checking target ID column 151B of the operation test data table 1510, and the checking target 1530 is associated with the operation test data table 1510.

The operation test result table 1540 corresponds to the operation test result 1403 shown in FIG. 15.

The operation test result table 1540 includes a test ID column 1541, the sampling target ID column 1542, the test target attribute column 1543, a checking result column 1544, and a comment column 1545. Test IDs stored in the test ID column 1541 of the operation test result table 1540 are identifiers that uniquely identify respective tests, which are operation assessments. The test IDs are also used in the test ID column 1511 of the operation test data table 1510, and the operation test result table 1540 is associated with the operation test data table 1510.

The operation test assessment 1550 is included in the operation test result 1403 shown in FIG. 15.

The operation test assessment 1550 includes a process ID column 1551, a process name column 1552, the control ID column 1553, a response-to-primary-assessment column 1554, a test continuation column 1555, a comment column 1556, an execution person column 1557, an execution date column 1558, a final assessment column 1559, a deficiency content column 155A, an assessing person column 155B, and an assessment date column 155C.

The deficiency list table 1560 is included in the operation test result 1403 shown in FIG. 15.

The deficiency list table 1560 includes a process ID column 1561, a process name column 1562, the control ID column 1563, the alternative control column 1564, a countermeasure column 1565, and an improvement plan column 1566.

The remaining risk list table 1570 is included in the operation test result 1403 shown in FIG. 15.

The remaining risk list table 1570 includes a process ID column 1571, a process name column 1572, the risk ID column 1573, a complement control column 1574, a column 1575 for indicating as to whether or not a countermeasure is required, an improvement plan column 1576, a complement control column 1577, a column 1578 for indicating as to whether or not a counter measure is required, and an improvement plan column 1579.

The operation test review table 1580 is included in the operation test result 1403 shown in FIG. 15.

The operation test review table 1580 includes a voucher name column 1581, a review result column 1582, a reviewer comment column 1583, a review date column 1584, and a reviewer column 1585.

Next, an example of screens, which the internal-control processing server 2120 display on an output device, such as a display, of the internal-control processing server 2120 when performing operation assessment that is a kind of assessment of the financial internal control, will be described with reference to FIGS. 17 to 22.

In addition, an outline of the operation assessment is as follows.

Figure 21:
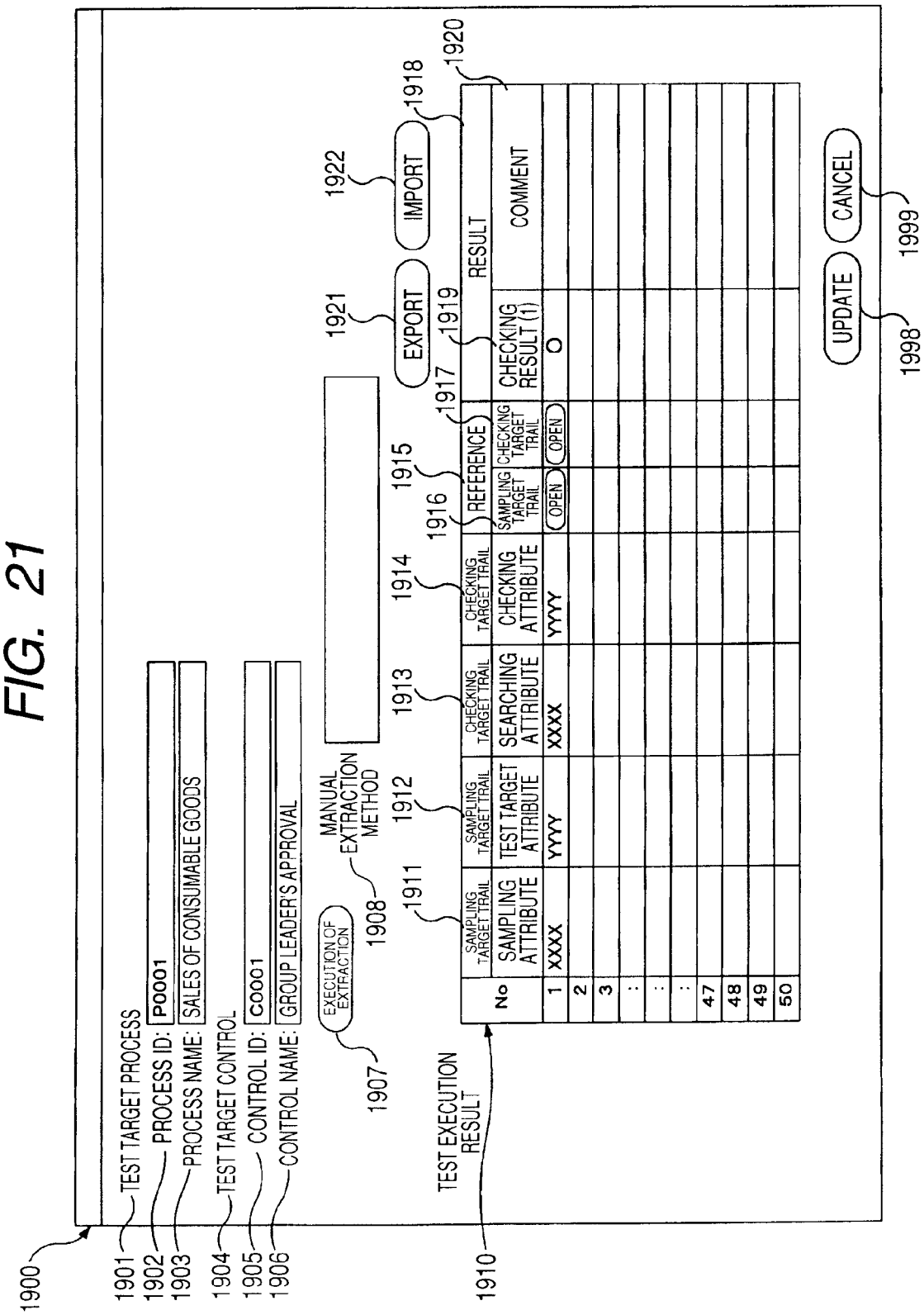
FIG. 21 is an explanatory view illustrating an example of a screen of an operation-test detail sheet (execution)

Using the four documents created for the financial internal control and data which is stored as a database and which is a basis of the four documents (elements, such as the RCM data 204, the resource data 205, the knowledge and information data 206, and the activity data 202 serving as key data thereof), a test content and a plan content for the operation assessment for planning the operation assessment (operation-test planning paper screen 1700 shown in FIG. 18) are input and the operation assessment test result for carrying out the operation assessment is input (refer to an operation-test procedure paper screen 1800 shown in FIG. 20 and an operation-test detail sheet (execution) screen 1900 shown in FIG. 21). A test result of the operation assessment is assessed (see an operation-test assessment paper screen 2000 shown in FIG. 22), and a deficiency list and a remaining risk list are output as comprehensive assessment of the operation assessment (a deficiency list screen 1100 shown in FIG. 12 and a remaining risk list screen 1200 shown in FIG. 13).

Figure 17:
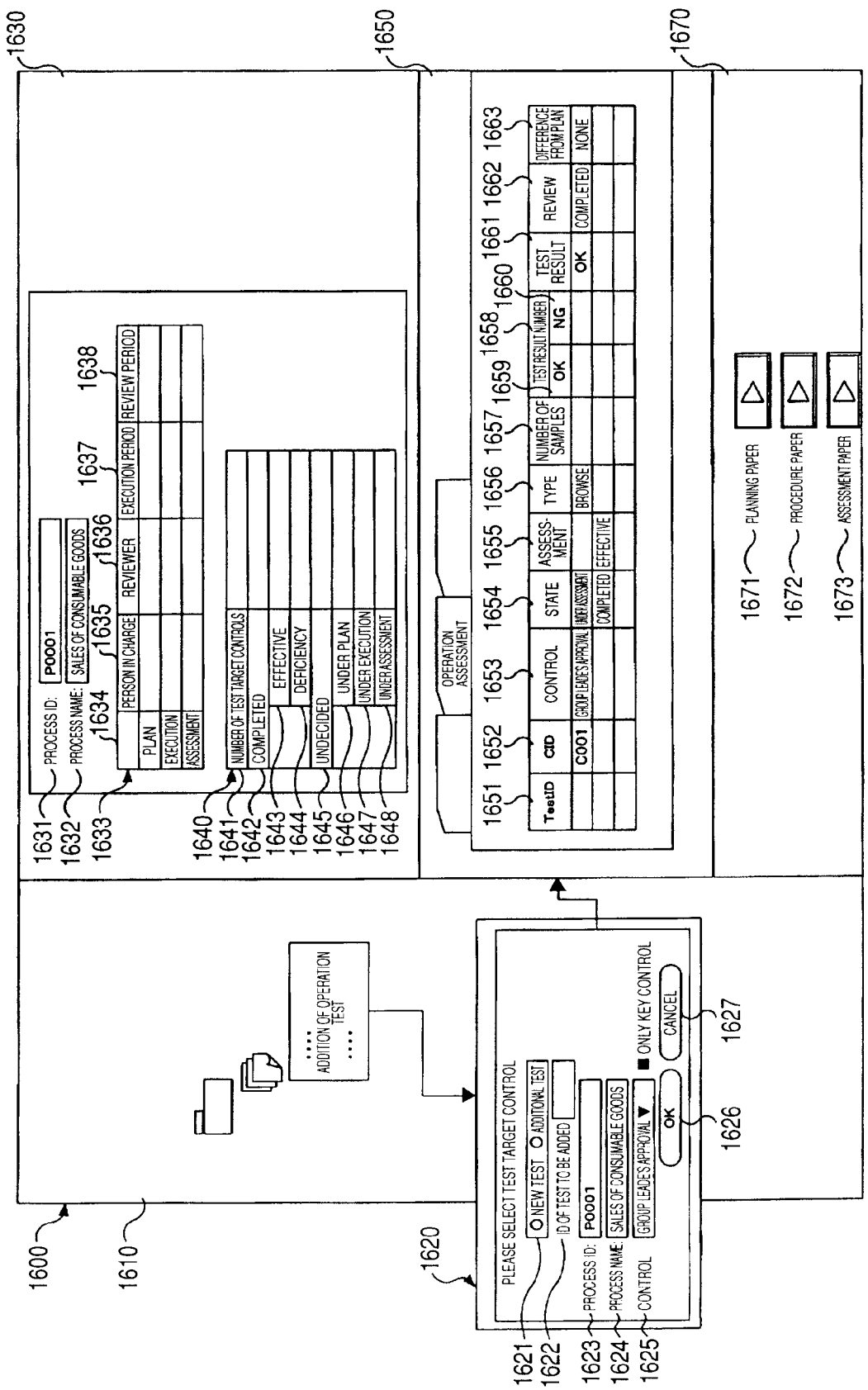
FIG. 17 is an explanatory view illustrating an example of a screen of tree display and operation test.

FIG. 17 is an explanatory view illustrating an example of a screen of tree display and operation test.

A tree screen and operation test 1600 includes a tree screen 1610, a progress screen 1630, an operation assessment screen 1650, and a processing screen 1670. The tree screen 1610 displays a target of the operation assessment in a tree structure. The progress screen 1630 shows a progress of the operation assessment with respect to a process. The operation assessment screen 1650 shows test items for the operation assessment. The processing screen 1670 displays buttons used to perform processing for creation of a planning paper, creation of a procedure paper, and creation of an assessment paper in the operation assessment.

In the case of adding a test for the operation assessment, an operation test addition screen 1620 is displayed in the tree screen 1610. An added test is defined by a test type column 1621, a column 1622 of an ID of the test to be added, a process ID column 1623, a process name column 1624, and a control column 1625.

The progress screen 1630 includes a process ID column 1631, a process name column 1632, an operation test plan table 1633 (the operation test plan table 1633 includes a plan/execution assessment column 1634, a person-in-charge column 1635, a reviewer column 1636, an execution period column 1637, and a review period column 1638), and a test progress table 1640 (the test progress table 1640 includes a test target control number column 1641, a completion column 1642, an effective column 1643, a deficiency column 1644, an undecided column 1645, an under-plan column 1646, an under-execution column 1647, and an under-assessment column 1648.

The operation assessment screen 1650 includes a test ID column 1651, a control ID column 1652, a control column 1653, a state column 1654, an assessment column 1655, a type column 1656, a sample number column 1657, a test result number column 1658 (OK column 1659 and NG column 1660), a test result column 1661, a review column 1662, and a difference-from-plan column 1663.

The processing screen 1670 displays a planning paper button 1671, a procedure paper button 1672, and an assessment paper button 1673. When the planning paper button 1671 is pressed by an operator's operation, the operation-test planning paper screen 1700 (see FIG. 18) is displayed. When the procedure paper button 1672 is pressed by the operator's operation, the operation-test procedure paper screen 1800 (see FIG. 20) is displayed. In addition, when the assessment paper button 1673 is pressed by the operator's operation, the operation-test assessment paper screen 2000 (see FIG. 22) is displayed.

FIGS. 18 and 19 are explanatory views illustrating an example of screens of the operation-test planning paper.

On the operation-test planning paper screen 1700, a test target period column 1701, a company name column 1702, a process ID column 1703, a process name column 1704, a control column 1705, a procedure type column 1706, an execution content column 1707, a sampling number column 1708, a modification reason column 1710, a deviation rate 1712, a reliability column 1713 and an allowable NG number column 1714 of an assessment criteria 1711, a sampling target 1715, a checking target 1722, and a review screen 1730 are displayed with referencing to data, such as the activity data 1402 and the RCM data 1404, stored in the database 1400.

The test target period column 1701 is displayed to receive period data (for example, 2008/04/01 to 2009/03/31) input by an operator's operation.

A documentation process name corresponding to the test plan and control information corresponding to the test plan are displayed in the process name column 1704 and the control column 1705, respectively.

By an operator's operation, a procedure type (question/observation/browse/check) is selectively input as test data by using the procedure type column 1706, and an execution content of the test are input through the execution content column 1707.

By an operator's operation, number of samples of test data is input through the sampling number column 1709. In the case where modification is performed by pressing of the modification button 1709 after the input, a reason for the modification is input through the modification reason column 1710.

When a deviation rate and reliability are input as assessment criteria through the reliability column 1713, the allowable NG number is automatically calculated from the number of controls and is then displayed in the allowable NG number column 1714.

The sampling target 1715 includes a knowledge and information (trail) column 1716, a sampling attribute column 1717, and a test target attribute column 1718.

Figure 19A:
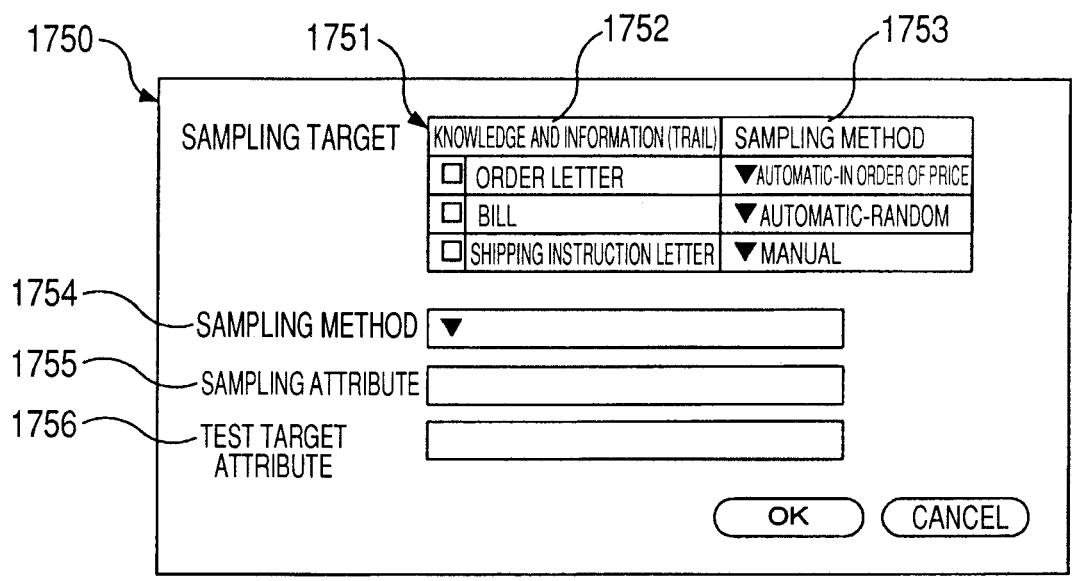
FIG. 19A is an explanatory view illustrating an example of a screen of the operation-test planning paper.

When an addition button 1719 is pressed by an operator's operation, a sampling target addition screen 1750 shown in FIG. 19A is displayed.

A sampling target 1751 including a knowledge and information (trail) column 1752 and a sampling method column 1753, a sampling method column 1754, a sampling attribute column 1755, and a test target attribute column 1756 are displayed on the sampling target addition screen 1750. In addition, by an operator's operation, trail information (related document) and its sampling method (automatic extraction of data, random and automatic extraction of data, and manual extraction under a designated condition) are selected as a sampling target of test data in the knowledge and information (trail) column 1752 and the sampling method column 1753 or the sampling method column 1754.

In addition, even in the case where an editing button 1720 is pressed by an operator's operation, the sampling target addition screen 1750 is displayed in the same manner as the case of the addition button 1719 such that contents can be edited. When a deletion button 1721 is pressed by an operator's operation, a selected trail in the sampling target 1715 is deleted.

The checking target 1722 includes a knowledge and information (trail) column 1723, a sampling attribute column 1724, and a test target attribute column 1725.

Figure 19B:
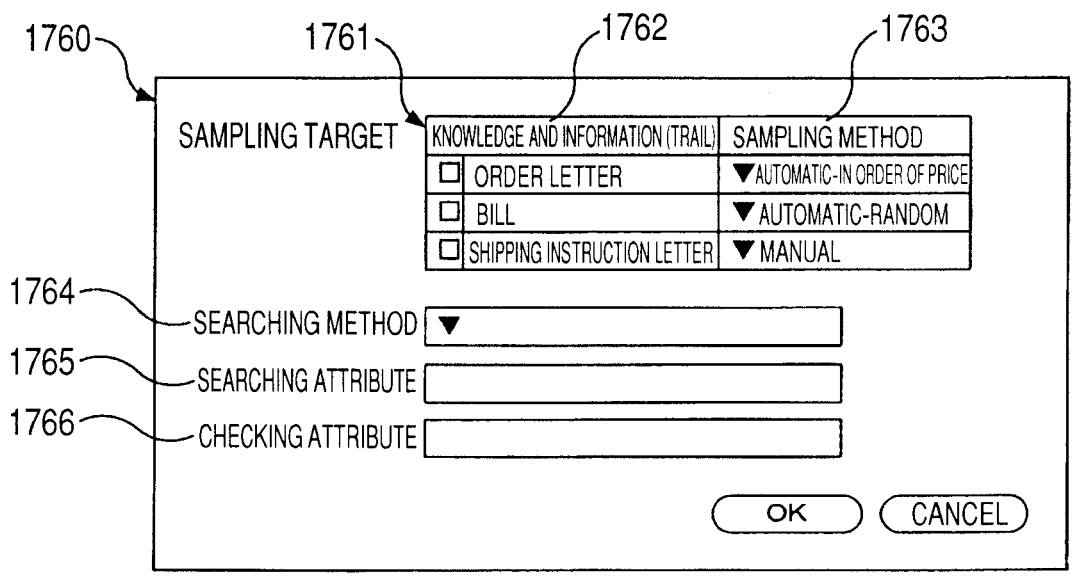
FIG. 19B is an explanatory view illustrating an example of a screen of the operation-test planning paper.

When an addition button 1726 is pressed by an operator's operations a checking target addition screen 1760 shown in FIG. 19B is displayed.

A sampling target 1761 including a knowledge and information (trail) column 1762 and a sampling method column 1763, a searching method column 1764, a searching attribute column 1765, and a checking attribute column 1766 are displayed on the checking target addition screen 1760. In addition, by an operator's operation, trail information (related document) and its sampling method (automatic extraction of data, random and automatic extraction of data, and manual extraction under a designated condition) are selected as a checking target for checking a test in the knowledge and information (trail) column 1762 and the sampling method column 1763 or the searching method column 1764.

In addition, even in the case where an editing button 1727 is pressed by an operator's operation, the checking target addition screen 1760 is displayed in the same manner as the case of the addition button 1726 such that contents can be edited. When a deletion button 1728 is pressed by an operator's operation, a selected trail in the checking target 1722 is deleted.

In order to cause the operation-test planning paper to be reviewed, an E-mail is transmitted to a reviewer by pressing of a review completion button 1735 which is an operator's operation.

The review request allows the reviewer to perform input to a review result column 1731, a reviewer comment column 1732, a reviewer column 1733, and a review date column 1734 in a review screen 1730. That is, items in the review screen 1730 are activated. Moreover, on the operation-test planning paper screen 1700 viewed by the reviewer, a button display of the review completion button 1735 is set as 'completion of review' A review is fixed by pressing of the review completion button 1735 which is a reviewer's operation.

In addition, when an update button 1736 is pressed by an operator's operation, data stored in the database 1400 is updated with contents input onto the current operation-test planning paper screen 1700. In addition, when a cancel button 1737 is pressed by an operator's operation, the contents are cancelled to return to a previous state.

FIG. 20 is an explanatory view illustrating an example of a screen of the operation-test procedure paper.

A test target period column 1801, a company name column 1802, a process ID column 1804 and a process name column 1805 of a test target process 1803, a control ID column 1807 and a control name column 1808 of a test target control 1806, a test execution procedure column 1810, an execution content column 1811, a sampling number column 1812, an extraction method column 1622, an execution person column 1113, an execution period column 1814, a difference-from-plan column 1815, a difference content column 1823, a test result number 1816, a result column 1820, a comment column 1821, and a review screen 1830 are displayed on the operation-test procedure paper screen 1800 with referencing to data, such as operation test data 1401, stored in the database 1400. When a test result sheet button 1809 is pressed by an operator's operation, a corresponding test result sheet is displayed on another screen.

A test target period column 1801 is displayed to receive period data (for example, 2008/04/01 to 2009/03/31) input by an operator's operation.

A documentation process name of a test target, control information of the test target, and information about test data created in the operation-test planning paper (see FIGS. 18 and 19) are displayed in the process name column 1805, the test target control 1806, and the test execution procedure column 1810.

By an operator's operation, an execution person, an execution period, a difference (Yes/None) from a plan, and a difference content are input as test results through the execution person column 1813, the execution period column 1814, the difference-from-plan column 1815, and the difference content column 1823.

The total number of tests, the number of CK cases, and the number of NG cases are displayed as the number of test results on a test number column 1817, an OK column 1818, an NG column 1819 of the test result number 1816. Moreover, with comparing with the allowance NG number in the allowable NG number column 1714 of the operation-test planning paper (see FIGS. 18, 19A and 19B), OK and NG are displayed as a result of a test on the result column 1820. In response to an operator's operation, a comment is input through the comment column 1821.

In order to cause an operation-test procedure paper to be reviewed, an E-mail is transmitted to a reviewer by pressing of a review request button 1840 which is an operator's operation.

The review request allows the reviewer to input to a review result column 1831, a reviewer comment column 1832, a reviewer column 1833, and a review date column 1834 in the review screen 1830, That is, items in the review screen 1830 are activated. Moreover, on the operation-test procedure paper screen 1800 viewed by the reviewer, a button display of the review request button 1840 is set as 'completion of review'. The review is fixed by pressing of the review request button 1840 which is a reviewer's operation.

In addition, when an update button 1898 is pressed by an operator's operation, data stored in the database 1400 is updated with contents input onto the current operation-test procedure paper screen 1800. In addition, when a cancel button 1899 is pressed by an operator's operation, the contents are cancelled to return to a previous state.

FIG. 21 is an explanatory view illustrating an example of a screen of the operation-test detail sheet (execution).

A process ID column 1902 and a process name column 1903 of a test target process 1901, a control ID column 1905 and a control name column 1906 of a test target control 1904, a manual extraction method column 1908, and a test execution result 1910 are displayed on the operation-test detail sheet (execution) screen 1900 with referencing to data, such as the operation test data 1401, stored in the database 1400.

A documentation process name of a test target and control information of the test target are displayed in the process name column 1903 and the test target control 1904, respectively.

When an extraction execution button 1907 is pressed by an operator's operation, a sampling target is extracted on the basis of a method input into the manual extraction method 1908.

The test execution result 1910 includes a sampling attribute column 1911 of a sampling target trail, a test attribute column 1912 of the sampling target trail, a searching attribute column 1913 of a checking target trail, a checking attribute column 1914 of the checking target attribute, a reference column 1915 (a sampling target trail column 1916 and a checking target trail column 1917), and a result column 1918 (a checking result (1) column 1919 and a comment column 1920) The test executed result 1910 displays an export for acquiring sampling data and exported data as a list.

In addition, when an export button 1921 is pressed by an operator's operation, data contents of the test execution result 1910 are output in the form of a CSV (comma separated value). In addition, when an import button 1922 is pressed by an operator's operation, external data in the form of a CSV is read and displayed on the test execution result 1910.

In addition, when an update button 1998 is pressed by an operator's operation, data stored in the database 1400 is updated with contents input onto the current operation-test detail sheet (execution) screen 1900. In addition, when a cancel button 1999 is pressed by an operator's operation, the contents are cancelled to return to a previous state.

Figure 22:
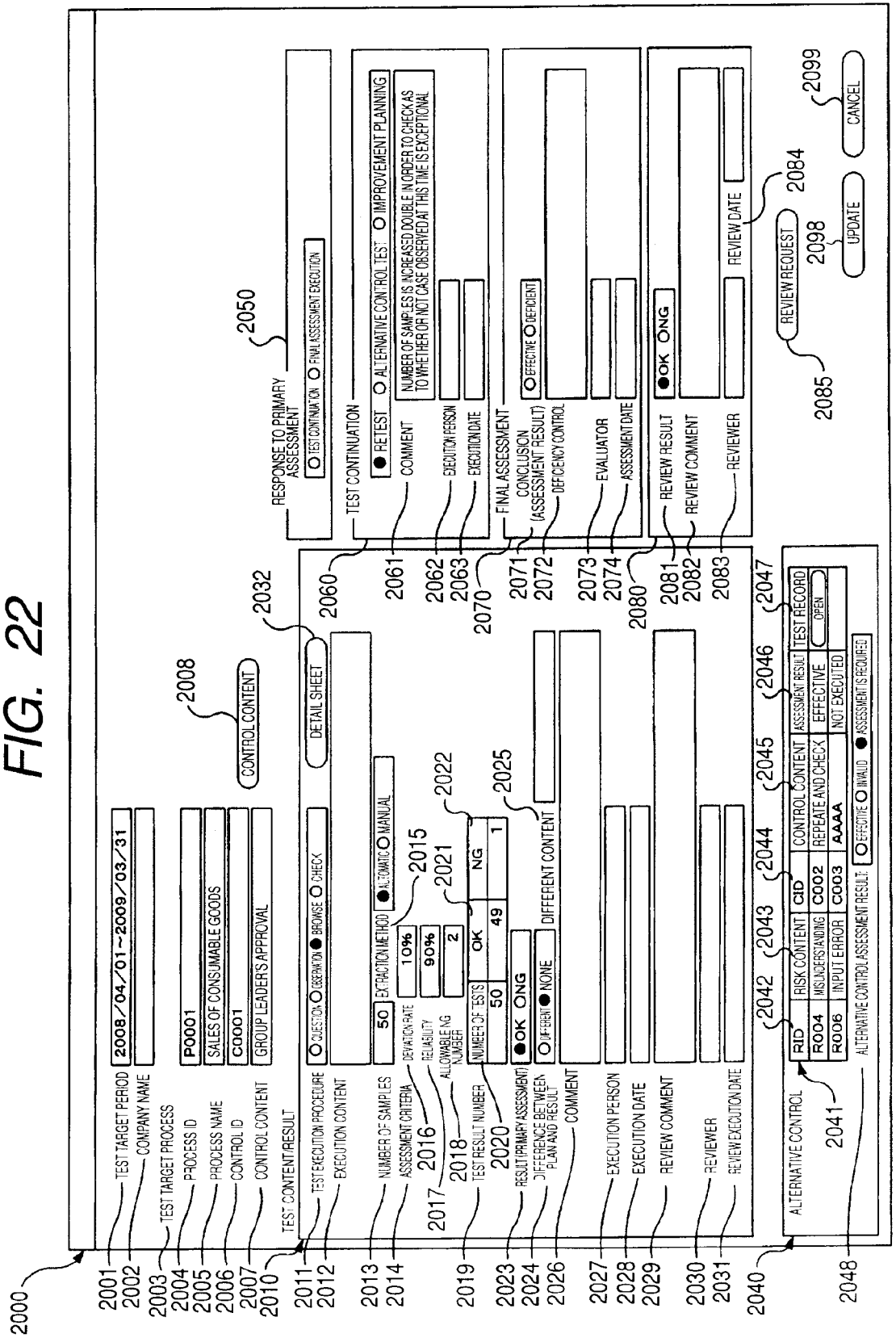
FIG. 22 is an explanatory view illustrating an example of a screen of an operation-test assessment paper.

FIG. 22 is an explanatory view illustrating an example of a screen of the operation-test assessment paper.

A test target period column 2001, a company name column 2002, a process ID column 2004, a process name column 2005, a control ID column 2006 and a control content column 2007 of a test target process 2003, a test content/result screen 2010, an alternative control screen 2040, a response-to-primary-assessment screen 2050, a test continuation screen 2060, a final assessment screen 2070, and a review result screen 2080 are displayed on the execution test assessment paper screen 2000 with referencing to data, such as the operation test result 1403, stored in the database 1400.

A documentation process name of the test target, control information of the test target, and information of a test result of the test target are displayed in the process name column 2005, the control content column 2007, and the test content/result screen 2010, respectively.

In addition, when a control detail button 2008 is pressed by an operator's operation, a corresponding control detail screen 900 is displayed.

Furthermore, a test execution procedure column 2011, an execution content column 2012, a sample number column 2013, an extraction method column 2015, a deviation rate 2016, a reliability column 2017, and an allowable NG number column 2018 of an assessment criteria 2014, a test result number 2019 (a test number column 2020, an OK column 2021, and an NG column 2022), a result (primary assessment) column 2023, a difference-from-plan column 2024, a difference content column 2025, a comment column 2026, an execution person column 2027, an execution date column 2028, a reviewer comment column 2029, a reviewer column 2030, and a review execution date column 2031 are displayed on the test content/result screen 2010 with referencing to data, such as the operation test result 1403, stored in the database 1400.

A list of alternative controls with which the target control can be replaced is displayed on the alternative control screen 2040 on the basis of the RCM data 1404 in the database 1400.

In addition, the alternative control screen 2040 includes an alternative control table 2041, which includes a risk ID column 2042, a risk content column 2043, a control ID column 2044, a control content column 2045, an assessment result column 2046, and a test record column 2047, and an alternative control assessment result column 2048.

Designation of 'continuation of a test' or 'final assessment execution' is input through the response-to-primary-assessment screen 2050, as a response to the primary assessment that is an operator's determination based on the test result.

In the case where the test continuation is selected, selection of any one of a re-test, an alternative control test, and an improvement planning; comments; an execution person; and execution date and time are input by an operator's operation through the test continuation screen 2060 (a comment column 2061, an execution person column 2062, and an execution date column 2063).

In the case where the final assessment is selected, selection of 'effective' or 'deficient' as a conclusion is input through the final assessment screen 2070 (a conclusion (assessment result) column 2071, a deficiency content column 2072, an assessing person column 2073, and an assessment date column 2074. Particularly in the case of 'deficient', deficiency contents are input through the final assessment screen 2070.

In order to cause the operation-test assessment paper to be reviewed, an E-mail is transmitted to a reviewer by pressing of a review request button 2085 which is an operator's operation.

The review request allows the reviewer to input to a review result column 2081, a reviewer comment column 2082, a reviewer column 2083, and a review date column 2084 in the review result screen 2080. That is, items in the review result screen 2080 are activated. Moreover, on the operation-test assessment paper screen 2000 viewed by the reviewer, a button display of the review request button 2085 is set as 'completion of review' The review is fixed by pressing of the review request button 2085 which is a reviewer's operation.

In addition, when an update button 2098 is pressed by an operator's operation, data stored in the database 1400 is updated with contents input onto the current operation-test assessment paper screen 2000. In addition, when a cancel button 2099 is pressed by an operator's operation, contents are cancelled to return to a previous state.

Next, the deficiency list screen 1100 at the time of the operation assessment will be described with reference to FIG. 12.

A deficiency list 1110 is displayed on the deficiency list screen 1100 with referencing to data, such as the deficiency list table 1560, stored in the database 1400. The deficiency list 1110 includes a process ID column 1111, a process name column 1112, a control ID column 1113, a control content column 1114, an alternative control column 1115, a countermeasure column 1116, and an improvement plan column 1117.

On the deficiency list screen 1100, a process ID, a process control ID, and a control content all of which are related to a control in which the number of test results exceeds the allowable NG number in the assessment criteria of the operation-test assessment paper (see FIG. 22) are displayed in the process ID column 1111, the process name column 1112, the control ID column 1113, and the control content column 1114, respectively.

In the alternative control column 1113, a list of alternative controls with which a target control can be replaced is displayed using the RCM data 1404 in the database 1400. In addition, existence of a countermeasure and an improvement plan with respect to a corresponding control are displayed so as to allow the operator to input into the countermeasure column 1116 and the improvement plan column 1117, respectively.

Next, the remaining risk list screen 1200 at the time of the operation assessment will be described with reference to FIG. 13.

A remaining risk list 1210 is displayed on the remaining risk list screen 1200 with referencing to data, such as the remaining risk list table 1570, stored in the database 1400. The remaining risk list 1210 includes a process ID column 1211, a process name column 1212, a risk ID column 1213, a risk content column 1214, a complement control column 1215, a column 1216 for indicating as to whether or not a countermeasure is required, an improvement plan column 1217, a column 1218 for indicating financial importance, an occurrence probability column 1219, and a comprehensive assessment column 1220.

For each control belonging to the deficiency list (see FIG. 12), a process ID, a process name, a risk ID, a risk name, and indication as to whether or not a complement control exists which are all related to a risk which have no effective control are displayed in the process ID column 1211, the process name column 1212, the risk ID column 1213, the risk content column 1214, and a complement control column 1215, respectively, using data such as the RCM data 204 stored in the database 1400.

Indication as to whether or not a countermeasure is required, an improvement plan, financial importance, an occurrence probability, and comprehensive assessment regarding the corresponding risk are displayed in the column 1216 for indicating as to whether or not a countermeasure is required, the improvement plan column 1217, the column 1218 for indicating financial importance, the occurrence probability column 1219, and the comprehensive assessment column 1220, respectively, so as to allow the operator input thereinto.

In addition, as shown in FIG. 24, the hardware configuration of a computer in which a program according to the exemplary embodiment is executed is the same as that of a typical computer. Specifically, the client 2110 is a personal computer, for example, and the internal-control processing server 2120 is a computer that can serve as a server. The hardware configuration of a computer in which a program according to the exemplary embodiment includes: a CPU 2201 for executing programs of modules, such as the WT planning paper output module 221, the WT detail sheet (plan) output module 222, the WT procedure paper output module 223, and the WT detail sheet (execution) output module 224 or the operation planning paper output module 1421, the operation detail sheet (plan) output module 1422, the operation procedure paper output module 1423, and the operation detail sheet (execution) output module 1424; a RAM 2202 in which the programs and data are stored; a ROM 2203 in which a program used to start the computer and the like are stored; an HD 2204 that is an auxiliary storage device; an input device 2206 used to input data, such as a keyboard or a mouse; an output device 2205, such as a CRT or a liquid crystal display; a communication line interface 2207 used for connection with a communication network; and a bus 2208 that connects those described above so that data can be exchanged therebetween. The plurality of computers may be connected to each other through a network.

In addition, the hardware configuration shown in FIG. 24 is an example of the configuration. A configuration that allows the modules explained in the exemplary embodiment to be executable may be adopted in the exemplary embodiment without being limited to the configuration shown in FIG. 24. For example, some of the modules may be realized using dedicated hardware (for example, ASIC). In particular, in addition to the personal computer, the program according to the program may be included in a portable information terminal such as a personal digital assistant, an information appliance, a copying machine, a facsimile, a scanner, a printer, a composite machine (also referred to as a multi-functional copying machine and has functions of a scanner, a printer, a copying machine, a facsimile, and the like), and the like.

Furthermore, the program described above may be provided in a state in which the program is stored in a recording medium or the program may be provided through a communication unit. In this case, the program described above may be regarded as the invention of a 'computer-readable recording medium in which a program is recorded', for example.

The 'computer-readable recording medium in which a program is recorded' refers to a recording medium that can be read by a computer recorded with a program, which is used for installation, execution, distribution, and the like of the program.

For example, recording mediums include: in association with a digital versatile disk (DVD), 'DVD-R, DVD-RW, DVD-RAM, and the like' that are standards established by a DVD forum and 'DVD+R, DVD+RW, and the like' that are standards established by a DVD+RW forum; in association with a compact disk (CD), a read only memory (CD-ROM), a CD recordable (CD-R), and a CD rewritable (CD-RW), and the like; a magneto-optic disk (MO); a flexible disk (FD); a magnetic tape; a hard disk; a read only memory (ROM); an electrically erasable and programmable read only memory (EEPROM); a flash memory; and a random access memory (RAM).

In addition, the program or a part of the program may be stored or distributed in a state in which the program or a part of the program is recorded in the recording medium. Furthermore, the program may be transmitted through communication, for example, a wireline network such as a local area network (LAN), a metropolitan area network (MAN), a wide area network (WAN), Internet, an intranet, and an extranet or a wireless communication network. Alternatively, the program may be transmitted through a transmission medium obtained by combination of those described above or may be carried on a carrier.

Moreover, the program described above may be a part of another program or may be recorded on a recording medium together with a separate program.

What is claimed is:

1. An information processing system comprising:
   a receiving unit that receives a plurality of risks and a plurality of controls, wherein the plurality of risks are improperly user implemented steps of a process defined by a document and the plurality of controls are safeguards that detect the errors;
   a risk control matrix storage unit that stores a risk control matrix, the risk control matrix defining relationships between the plurality of risks and the plurality of controls;
   an assessment result storage unit that stores an evaluation of a design effectiveness of the document, the evaluation indicating whether each of the plurality of controls is effective for controlling risks among the plurality of risks associated with each of the plurality of controls based on the relationships in the risk control matrix;
   a display unit that displays whether the plurality of controls is effective for controlling the plurality of risks, in units of risks based on the evaluation of design effectiveness stored in the assessment result storage unit; and
   a dummy control setting unit that automatically sets a dummy control for a risk that does not have a control,
   wherein the display unit displays a risk having no corresponding control that the evaluation indicates as effective and a message indicating the dummy control is created in a remarks column, in a different manner from other risks.

2. A computer readable medium storing a program for causing a computer to execute information processing, the information processing comprising:
   receiving a plurality of risks and a plurality of controls, wherein the plurality of risks are improperly user implemented steps of a process defined by a document and the plurality of controls are safeguards that detect the errors;
   storing a risk control matrix, the risk control matrix defining relationships between the plurality of risks and the plurality of controls;
   storing an evaluation of a design effectiveness of the document, the evaluation indicating whether each of the plurality of controls is effective for controlling risks among the plurality of risks associated with each of the plurality of controls based on the relationships in the risk control matrix;
   displaying whether the plurality of controls is effective for controlling the plurality of risks, in units of risks based on the stored evaluation design effectiveness; and
   setting a dummy control for a risk that does not have a control,
   wherein the displaying comprises displaying a risk having no corresponding control that the evaluation indicates as effective and a message indicating the dummy control is created in a remarks column, in a different manner from other risks.

3. The system according to claim 1, wherein the safeguards include repetition by an operator.

4. The system according to claim 1, wherein the safeguards include review by a person in charge.

5. The system according to claim 1, wherein the safeguards include approval of a senior person.

6. The system according to claim 1, wherein the safeguards include crosscheck by a person in charge.

7. The system according to claim 1, wherein the safeguards include review by a financial department.

8. The system according to claim 1, wherein the display unit displays the risk in a different color from the other risks.

9. The system according to claim 1, wherein the display unit blinks the risk.

* * * * *